US009915176B2

(12) United States Patent
Murray et al.

(10) Patent No.: US 9,915,176 B2
(45) Date of Patent: Mar. 13, 2018

(54) SHROUD ASSEMBLY FOR TURBINE ENGINE

(71) Applicant: General Electric Company, Schectady, NY (US)

(72) Inventors: Robert Carl Murray, Rotterdam, NY (US); Gregory Michael Laskowski, Rowley, MA (US); Corey Bourassa, Mechanicville, NY (US); Byron Andrew Pritchard, Jr., Loveland, OH (US); Curtis Walton Stover, Mason, OH (US)

(73) Assignee: General Electric Company, Schenectady, NY (US)

(*) Notice: Subject to any disclaimer, the term of this patent is extended or adjusted under 35 U.S.C. 154(b) by 212 days.

(21) Appl. No.: 14/715,700

(22) Filed: May 19, 2015

(65) Prior Publication Data

US 2015/0345331 A1 Dec. 3, 2015

Related U.S. Application Data

(60) Provisional application No. 62/004,766, filed on May 29, 2014.

(51) Int. Cl.

*F01D 25/24* (2006.01)
*F02C 7/18* (2006.01)
*F01D 25/14* (2006.01)

(52) U.S. Cl.

CPC ............. *F01D 25/24* (2013.01); *F01D 25/14* (2013.01); *F02C 7/18* (2013.01); *F05D* *2240/11* (2013.01);

(Continued)

(58) Field of Classification Search

CPC . F01D 25/14; F01D 25/24; F02C 7/18; F05D 2240/11; F05D 2260/607; Y02T 50/675

See application file for complete search history.

(56) References Cited

U.S. PATENT DOCUMENTS

| | | | |
|---|---|---|---|
| 2,806,551 | A | 9/1957 | Heinrich |
| 3,064,411 | A | 11/1962 | Breslove, Jr. |

(Continued)

FOREIGN PATENT DOCUMENTS

| | | | |
|---|---|---|---|
| EP | 0162441 | A2 | 11/1985 |
| EP | 0227577 | B1 | 1/1992 |

(Continued)

OTHER PUBLICATIONS

PCT Search Report and Written Opinion issued in connection with related PCT Application No. PCT/US2015/033108 dated Jul. 12, 2016.

(Continued)

*Primary Examiner* — Igor Kershteyn
(74) *Attorney, Agent, or Firm* — General Electric Company; William Scott Andes

(57) ABSTRACT

A shroud assembly for a turbine engine includes a shroud having a front side confronting the blades of a turbine and a back side opposite the front side, a hanger configured to couple the shroud to with casing of the turbine, a cooling conduit extending through the hanger to supply a cooling fluid stream to the back side of the shroud, and a particle separator having a through passage forming part of the cooling conduit and a scavenge conduit branching from the through passage.

14 Claims, 31 Drawing Sheets

(52) U.S. Cl.
CPC ....... *F05D 2260/607* (2013.01); *Y02T 50/675* (2013.01)

(56) References Cited

U.S. PATENT DOCUMENTS 3,274,757 A 9/1966 Wapler
3,302,396 A 2/1967 Robbins
3,309,867 A 3/1967 Ehrich
3,421,299 A 1/1969 Poplawski
3,993,463 A 11/1976 Barr
4,378,234 A 3/1983 Suzuki et al.
4,527,387 A 7/1985 Lastrina et al.
4,650,578 A 3/1987 Cerdan et al.
4,685,942 A 8/1987 Klassen et al.
4,820,122 A 4/1989 Hall et al.
4,820,123 A 4/1989 Hall
4,992,025 A 2/1991 Stroud et al.
5,062,768 A 11/1991 Marriage
5,135,354 A 8/1992 Novotny
5,193,975 A 3/1993 Bird et al.
5,279,109 A 1/1994 Liu et al.
5,348,571 A 9/1994 Weber
5,498,273 A 3/1996 Mann
5,538,394 A 7/1996 Inomata et al.
5,558,496 A 9/1996 Woodmansee et al.
5,700,131 A 12/1997 Hall et al.
5,788,741 A 8/1998 Burton et al.
5,827,043 A 10/1998 Fukuda et al.
5,857,833 A 1/1999 Dev
5,918,458 A 7/1999 Coffinberry et al.
5,951,250 A 9/1999 Suenaga et al.
6,033,181 A 3/2000 Endres et al.
6,039,537 A 3/2000 Scheurlen
6,151,881 A 11/2000 Ai et al.
6,164,913 A 12/2000 Reddy
6,238,183 B1 5/2001 Williamson et al.
6,238,459 B1 5/2001 Downs
6,261,053 B1 7/2001 Anderson et al.
6,264,428 B1 7/2001 Dailey et al.
6,277,278 B1 8/2001 Conrad et al.
6,318,960 B1 11/2001 Kuwabara et al.
6,318,963 B1 11/2001 Emery et al.
6,368,060 B1 4/2002 Fehrenbach et al.
6,382,906 B1 5/2002 Brassfield et al.
6,413,044 B1 7/2002 Roeloffs et al.
6,527,829 B1 3/2003 Malkamaeki et al.
6,673,133 B2 1/2004 Sechrist et al.
6,698,180 B2 3/2004 Snyder
6,797,026 B2 9/2004 Sechrist et al.
6,840,737 B2 1/2005 Flatman
6,875,256 B2 4/2005 Gillingham et al.
6,910,370 B2 6/2005 Clark et al.
6,969,237 B2 11/2005 Hudson
7,048,501 B2 5/2006 Katayama et al.
7,052,532 B1 5/2006 Liu et al.
7,080,972 B2 7/2006 Rawlinson
7,097,419 B2 8/2006 Lee et al.
7,128,533 B2 10/2006 Liang
7,137,777 B2 11/2006 Fried et al.
7,244,101 B2 7/2007 Lee et al.
7,284,953 B2 10/2007 Silverman et al.
7,540,712 B1 6/2009 Liang
7,563,073 B1 7/2009 Liang
7,572,102 B1 8/2009 Liang
7,581,397 B2 9/2009 Strangman et al.
7,582,145 B2 9/2009 Krigmont
7,645,122 B1 1/2010 Liang
7,665,965 B1 2/2010 Liang
7,770,375 B2 8/2010 Alvanos et al.
7,874,158 B2 1/2011 O'Neill et al.
7,879,123 B2 2/2011 Lundquist et al.
7,921,654 B1 4/2011 Liang
7,922,784 B2 4/2011 Saeed et al.
7,934,906 B2 5/2011 Gu et al.
7,955,053 B1 6/2011 Liang
7,967,554 B2 6/2011 Bremer
7,976,277 B2 7/2011 Kopmels et al.
8,092,145 B2 1/2012 Martel et al.
8,104,362 B2 1/2012 McFarland et al.
8,142,153 B1 3/2012 Liang
8,176,720 B2 5/2012 Beeck
8,240,121 B2 8/2012 Hazzard et al.
8,348,614 B2 1/2013 Piggush et al.
8,561,411 B2 10/2013 Dibenedetto
8,573,034 B2 11/2013 Grant et al.
8,626,467 B2 1/2014 Fang
8,672,629 B2 3/2014 Botrel et al.
8,733,185 B2 5/2014 Solomon
8,746,464 B2 6/2014 Maier
2002/0166200 A1 11/2002 Conrad et al.
2002/0182062 A1 12/2002 Scimone
2004/0197191 A1 10/2004 Cunha et al.
2004/0221720 A1 11/2004 Anderson et al.
2005/0118024 A1 6/2005 McFeat et al.
2005/0129508 A1 6/2005 Fried et al.
2005/0214118 A1 9/2005 Dodd
2006/0073015 A1 4/2006 Liang
2006/0133923 A1 6/2006 Paauwe et al.
2006/0275118 A1 12/2006 Lee
2007/0048122 A1 3/2007 Van Suetendael, IV et al.
2007/0140848 A1 6/2007 Charbonneau et al.
2008/0041064 A1 2/2008 Moore et al.
2009/0060715 A1 3/2009 Kopmels
2009/0081024 A1 3/2009 Tibbott
2009/0126337 A1 5/2009 Hazzard et al.
2009/0155088 A1 6/2009 Lee et al.
2009/0202337 A1* 8/2009 Bosley .................... F01D 11/08 415/1
2009/0214329 A1 8/2009 Joe et al.
2009/0255230 A1 10/2009 Mildner
2009/0261208 A1 10/2009 Belyew
2010/0021308 A1 1/2010 Rawlinson
2010/0024370 A1 2/2010 Jones et al.
2010/0040480 A1 2/2010 Webster et al.
2010/0119377 A1 5/2010 Tibbott et al.
2010/0162682 A1 7/2010 Lerg
2010/0172762 A1 7/2010 Rawlinson
2010/0239409 A1 9/2010 Draper
2010/0247321 A1 9/2010 Kulkarni et al.
2010/0254801 A1 10/2010 Tibbott
2011/0016838 A1 1/2011 Smithies et al.
2011/0067378 A1 3/2011 Tibbott et al.
2011/0067409 A1* 3/2011 Beeck ....................... F01D 5/08 60/772
2011/0236188 A1 9/2011 Knapp et al.
2011/0247345 A1 10/2011 Laurello et al.
2011/0247347 A1 10/2011 Ebert et al.
2012/0070308 A1 3/2012 Naik et al.
2012/0207594 A1 8/2012 Chanez et al.
2012/0233973 A1 9/2012 Sedillo
2013/0192257 A1* 8/2013 Horine .................... F01D 11/08 60/796
2013/0223987 A1 8/2013 Stafford et al.
2014/0083116 A1 3/2014 Crites et al.
2014/0196437 A1 7/2014 Schneider
2014/0290254 A1 10/2014 Manning et al.
2016/0045923 A1 2/2016 Correia et al.
2016/0123154 A1 5/2016 Manning et al.
2016/0123227 A1 5/2016 Murray et al.
2017/0101896 A1 4/2017 Manning et al.
2017/0107834 A1 4/2017 Nasr et al.
2017/0107852 A1 4/2017 Nasr et al.
2017/0114720 A1 4/2017 Stone et al.

FOREIGN PATENT DOCUMENTS

EP 0340149 B1 5/1993
EP 0924408 A3 5/2001
EP 0690202 B1 8/2001
EP 1267037 B1 7/2006
EP 2549078 A1 1/2013
EP 2405985 B1 8/2013
EP 2927428 A1 10/2015
GB 711304 A 6/1954

(56) References Cited

FOREIGN PATENT DOCUMENTS

| | | |
|---|---|---|
| GB | 1070458 A | 6/1967 |
| GB | 1146262 A | 3/1969 |
| GB | 1412780 A | 11/1975 |
| GB | 2270481 A | 3/1994 |
| WO | 2011006262 A1 | 1/2011 |
| WO | 2011115880 A1 | 9/2011 |

OTHER PUBLICATIONS

European Search Report and Opinion issued in connection with related EP Application No 15190287.1 dated Mar. 4, 2016.
Sennett, "Air Filtration: Perfect Air Filtering for Gas Turbines." Filtration & Separation, vol. 44, Issue 10, Dec. 2007, pp. 20-22.
John Howard Starkweather et al., U.S. Appl. No. 62/004,736, filed May 29, 2014.
John Howard Starkweather et al., U.S. Appl. No. 62/004,728, filed May 29, 2014.
Gregory Michael Laskowski et al., U.S. Appl. No. 62/004,764, filed May 29, 2014.
Gregory Michael Laskowski et al., U.S. Appl. No. 62/004,763, filed May 29, 2014.
Gregory Michael Laskowski et al., U.S. Appl. No. 62/004,768, filed May 29, 2014.
Corey Bourassa et al., U.S. Appl. No. 14/867,379, filed Sep. 28, 2015.
Robert Carl Murray et al., U.S. Appl. No. 62/004,710, filed May 29, 2014.
Jared Peter Buhler et al., U.S. Appl. No. 62/073,538, filed Oct. 31, 2014.
Poplawski et al., "Microscopic Particle Separation and Applications", Aerospace Research Laboratories, 20 Years of Research Progress, Accession No. AD0667557, Project No. 7116, pp. 1-67, Feb. 1968.
Walsh et al., "Effects of Sand Ingestion on the Blockage of Film-Cooling Holes", Proceedings of GT2006, ASME Turbo Expo 2006: Power for Land, Sea and Air, Barcelona, Spain, vol. No. 3, pp. 81-90, May 8-11, 2006.
Musgrove et al., "Computational Design of a Louver Particle Separator for Gas Turbine Engines", Proceedings of ASME Turbo Expo 2009: Power for Land, Sea and Air, GT2009, Orlando, Florida, USA, vol. No. 3, pp. 1313-1323, Jun. 3-12, 2009.
Cardwell et al., "Investigation of Sand Blocking Within Impingement and Film-Cooling Holes", Journal of Turbomachinery, Transactions of the ASME, vol. No. 132, Issue No. 2, pp. 021020-1-021020-10, Apr. 2010.
Filippone et al., "Turboshaft Engine Air Particle Separation", Progress in Aerospace Sciences, vol. No. 46, Issue No. 5-6, pp. 224-245, Jul.-Aug. 2010.
Lawson et al., "Simulations of Multiphase Particle Deposition on Endwall Film-Cooling Holes in Transverse Trenches", Journal of Turbomachinery, Transactions of the ASME, vol. No. 134, pp. 051040-1-051040-10, Sep. 2012.
Lawson et al., "Simulations of Multiphase Particle Deposition on a Showerhead With Staggered Film-Cooling Holes", Journal of Turbomachinery, Transactions of the ASME, vol. No. 134, pp. 051041-1-051041-12, Sep. 2012.
European Search Report and Opinion issued in connection with corresponding EP Application No. 15169688.7 dated Oct. 27, 2015.
PCT Search Report and Written Opinion issued in connection with related PCT Application No. PCT/US2015/033180 dated Mar. 1, 2016.
PCT Search Report and Written Opinion issued in connection with related PCT Application No. PCT/US2015/032855 dated Mar. 14, 2016.
European Search Report and Opinion issued in connection with related EP Application No. 15191609.5 dated Mar. 18, 2016.
European Search Report and Opinion issued in connection with Related EP Application No. 16193374.2 dated Feb. 16, 2017.
Robert Francis Manning et al., U.S. Appl. No. 15/314,341, filed Nov. 28, 2016.
Robert Carl Murray et al., U.S. Appl. No. 14/867,379, filed Sep. 28, 2015.
Robert Francis Manning et al., U.S. Appl. No. 14/861,522, filed Sep. 22, 2015.
Victor Hugo Silva Correia et al., U.S. Appl. No. 14/713,119, filed May 15, 2015.
U.S. Appl. No. 62/004,710, filed May 29, 2014.
U.S. Appl. No. 62/004,728, filed May 29, 2014.
U.S. Appl. No. 62/004,764, filed May 29, 2014.
U.S. Appl. No. 62/004,768, filed May 29, 2014.
U.S. Appl. No. 15/210,783, filed Jul. 14, 2016.

* cited by examiner 110
112
118
120
122
124
126
128
134
136
138
140
A 250
296
262
300
284
294
260
264
268
286
266
254
258
282

SHROUD ASSEMBLY FOR TURBINE ENGINE

CROSS-REFERENCE TO RELATED APPLICATION

This application claims priority to U.S. Provisional Application Ser. No. 62/004,766, filed May 29, 2014, the disclosure of which is incorporated herein by reference.

BACKGROUND

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for airplanes, including helicopters. In airplanes, gas turbine engines are used for propulsion of the aircraft.

Gas turbine engines for aircraft are designed to operate at high temperatures to maximize engine thrust, so cooling of certain engine components, such as the high pressure turbine and the low pressure turbine, may be necessary. Typically, cooling is accomplished by ducting cooler air from the high and/or low pressure compressors to the engine components which require cooling. When cooling the turbines, cooling air may be passed through an interior of the turbine blades.

Particles, such as dirt, dust, sand, and other environmental contaminants, in the cooling air can cause a loss of cooling and reduced operational time or "time-on-wing" for the aircraft environment. For example, particles supplied to the turbine blades can clog, obstruct, or coat the flow passages and surfaces of the blades, which can reduce the lifespan of the turbine. This problem is exacerbated in certain operating environments around the globe where turbine engines are exposed to significant amounts of airborne particles.

BRIEF DESCRIPTION

The technology described herein relates to a shroud assembly for a turbine engine having a compressor, a combustor, and a turbine within a casing, with the turbine having a plurality of annularly-arranged fixed vanes defining nozzles therebetween and a plurality of annularly-arranged rotating blades paired with the fixed vanes to define one stage of the turbine. The shroud assembly includes a shroud having a front side confronting the blades and a back side opposite the front side, a hanger configured to couple the shroud with the casing, a cooling conduit extending through at least a portion of the hanger to supply a cooling fluid stream to the back side of the shroud, and at least one particle separator having a through passage forming part of the cooling conduit and a scavenge conduit branching from the through passage, wherein the at least one particle separator separates particles from the cooling fluid stream in the form of a concentrated-particle stream containing the separated particles, which is directed along the scavenge conduit, and the remaining cooling fluid stream forms a reduced-particle stream, which is passed along the cooling conduit to the back side of the shroud.

DETAILED DESCRIPTION

The described embodiments of the technology described herein are directed to systems, methods, and other devices related to particle separation, particularly in a turbine engine, and more particularly to particle separation for the removal of particles from a cooling air flow in a turbine engine. For purposes of illustration, the technology will be described with respect to an aircraft gas turbine engine. It will be understood, however, that the technology is not so limited and may have general applicability in non-aircraft applications, such as other mobile applications and non-mobile industrial, commercial, and residential applications.

Figure 1:
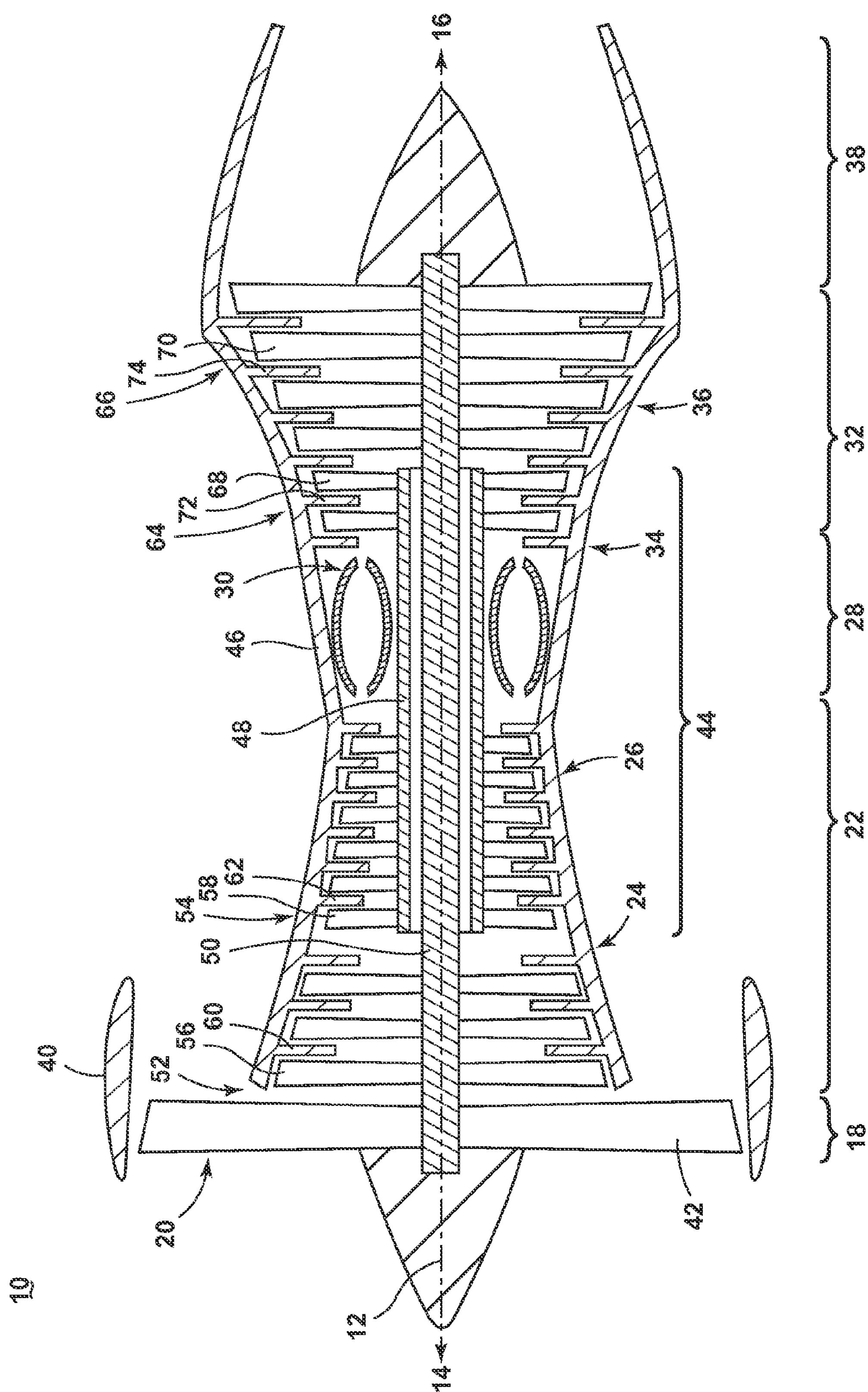
FIG. 1 is a schematic cross-sectional diagram of a gas turbine engine for an aircraft according to a first embodiment.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 including a fan casing 40 surrounding the fan 20. The fan 20 includes a plurality of fan blades 42 disposed radially shout the centerline 12.

The HP compressor 26, the combustor 30, and the HP turbine 34 form a core 44 of the engine 10 which generates combustion gases. The core 44 is surrounded by core casing 46 which can be coupled with the fan casing 40.

A HP shaft or spool 48 disposed coaxially about the centerline 12 of the engine 10 drivingly connects the HP turbine 34 to the HP compressor 26 and a LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 may be provided in a ring and may extend radially outwardly relative to the centerline 12, from a blade platform to a blade tip, while the corresponding static compressor vanes 60, 62 are positioned downstream of and adjacent to the rotating blades 56, 58.

In one example, the LP compressor 24 may include 4 stages and the HP compressor 26 may include 10 stages, although the number of compressor stages varies in different types of engines. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 may be provided in a ring and may extend radially outwardly relative to the centerline 12, from a blade platform to a blade tip, while the corresponding static turbine vanes 72, 74 are positioned upstream of and adjacent to the rotating blades 68, 70.

In one example, the HP turbine 34 may include 2 stages and the LP turbine 36 may include 6 stages, although the number of turbine stages varies in different types of engines. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 may bypass the engine core 44 and be used for cooling of portions, especially hot portions, of the engine 10, and/or used to cool or power other aspects of the aircraft. This air is often referred to as bypass air, which is one form of a cooling fluid when used to cool. In the context of a turbine engine, the hot portions of the engine are normally downstream of the combustor 30, especially the turbine section 32, with the HP turbine 34 being the hottest portion as it is directly downstream of the combustor section 28. Other portions of the aircraft, not part of the engine, may be considered a hot portion that is to be cooled.

Figure 2:
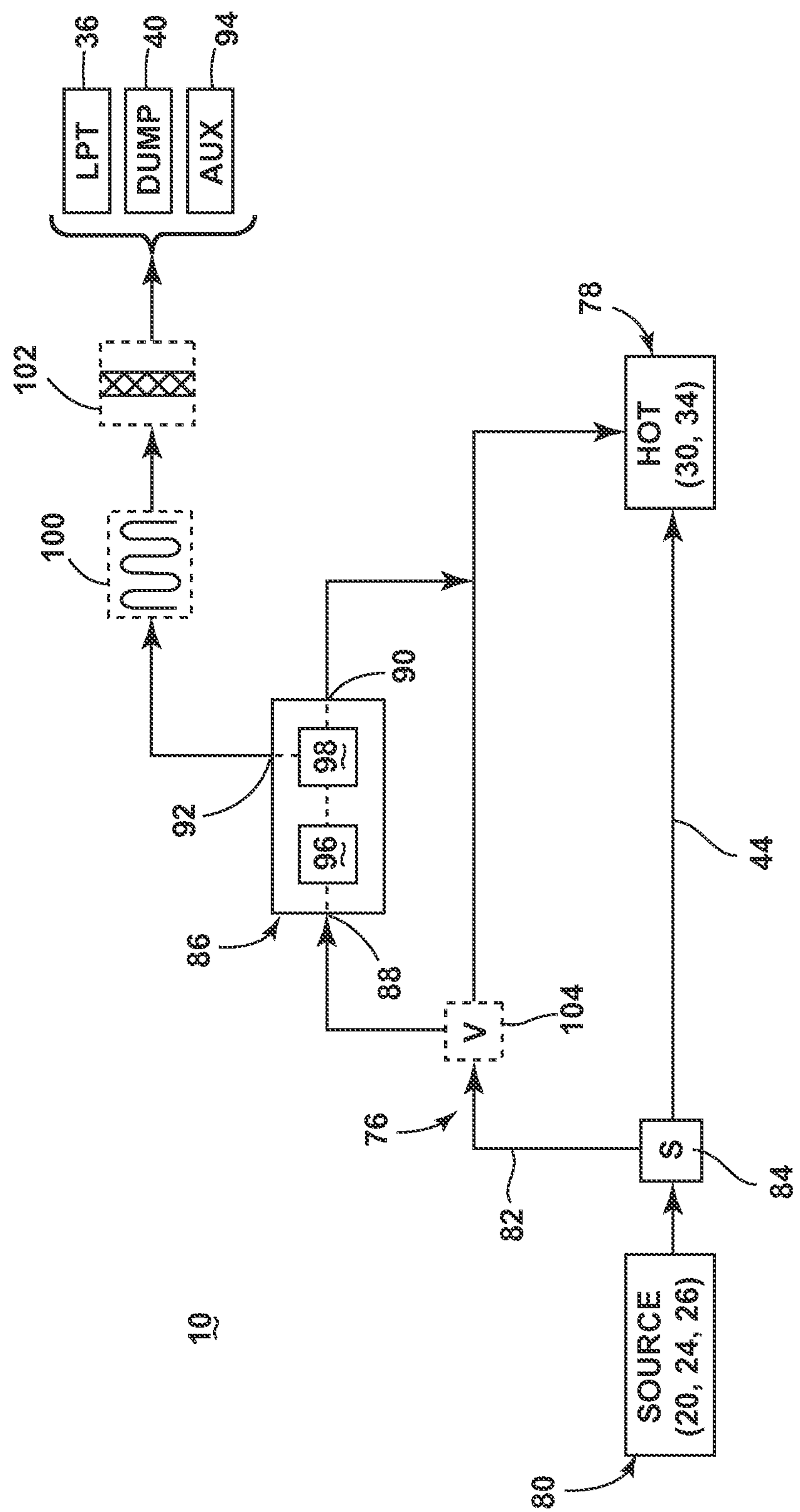
FIG. 2 is a schematic view showing a bypass cooling circuit for the engine of FIG. 1 according to a second embodiment.

FIG. 2 is a schematic view showing a portion of the engine 10 from FIG. 1. The engine 10 can further include a bypass cooling circuit 76 for providing cooling fluid to at least one hot portion 78 of the engine 10 during operation. In order to cool the hot portion 78 of the engine, the cooling fluid is at a temperature that is less than the operational temperature of the hot portion 78; i.e. the temperature of the hot portion 78 during normal operation of the engine 10. As indicated in FIG. 2, the hot portion 78 of the engine 10 may include, but is not limited to, the HP turbine 34 and the walls of the combustor 30. A source of cooling fluid 80 entering the bypass cooling circuit 76 may be, but is not limited to, fluid discharged from the fan 20, the LP compressor 24, or the HP compressor 26.

The bypass cooling circuit 76 includes a bypass conduit 82 which bypasses at least a portion of the core 44 of the engine 10 in order to provide cooling fluid to the hot portion 78 of the engine 10. Air may enter the bypass conduit 78 from the source of cooling fluid 80, and may exit the bypass conduit 82 at the hot portion 78 of the engine 10 to which the cooling fluid is to be supplied.

In one configuration, the bypass cooling circuit 76 can include a flow divider 84 which separates the fluid stream from the source of cooling fluid 80 into a core fluid stream which enters the core 44 and a bypass fluid stream which enters the bypass conduit 82. In one configuration, the flow divider 84 can be located between fan blades 42 and the LP compressor 24 (FIG. 1), with the core fluid stream entering the LP compressor 24 and the surrounding bypass fluid stream entering the bypass conduit 78. However, the location of the flow divider 84 can vary depending on the source of cooling fluid 80.

The bypass cooling circuit 76 may include a particle separator 86 for separating particles, which may include, but is not limited to, dirt, dust, debris, and other contaminants, from the cooling fluid stream from the source prior to being supplied to the hot portion of the engine 10. The particle separator 86 may, for example, be an inertial separator which separates particles from the cooling air flow using a combination of forces, such as centrifugal, gravitational and inertial. More specifically, the inertial separator may be a centrifugal or cyclonic separator, which uses cyclonic action to separate particles from the cooling air flow.

The particle separator 86 may define a portion of the bypass conduit 78, and may be located anywhere along the bypass conduit 78. The particle separator 86 includes a separator inlet 88, a separator outlet 90, and a particle outlet 92. The cooling fluid stream entering the particle separator 86 at the separator inlet 88 is separated into a concentrated-particle stream which contains at least some of the particles from the cooling fluid stream, and a reduced-particle stream which contains fewer or a lower concentration of particles than the concentrated-particle stream. The reduced-particle stream exits the particle separator 86 via the separator outlet 90, and is provided to the hot portion 78 of the engine 10 for cooling. The concentrated-particle stream exits the particle separator 86 via the particle outlet 92, and may be exhausted from the engine 10 or may be utilized in other portion of the engine 10. For example, the concentrated-particle stream may be used for driving the LP turbine 36, dumped from the engine 10 under the fan casing 40, or used for some auxiliary function 94, some examples of which are described in detail below. Alternatively, the particle outlet 92 may be coupled with a particle collector to collect the separated particles for later disposal.

In one example, the particle separator 86 can include at least a particle concentrator 96 and a flow splitter 98. The particle concentrator 96 is a structure that concentrates the particles contained in the fluid stream in one portion of the fluid stream. The flow splitter 98 is a structure that splits a fluid stream into separate streams. In this example, the particle concentrator 96 is fluidly downstream of the separator inlet 88, and generally moves the particles contained within the entire the cooling fluid stream in one portion of the cooling fluid stream to thereby create the concentrated-particle stream, with the remaining fluid now having fewer particles (though some particles may still be present) to form the reduced-particle stream. The flow splitter 98 is fluidly downstream of the particle concentrator 96, and splits the concentrated-particle stream from the reduced-particle stream. These two streams can be directed to different areas of the engine 10, with the reduced-particle stream exiting the particle separator 86 via the separator outlet 90 and the reduced-particle stream from the exiting via the particle outlet 92.

It is noted that while only one particle separator 86 is shown in FIG. 2, the bypass cooling circuit 76 may include multiple particle separators. The multiple particle separators may be arranged in parallel, such that the cooling fluid stream is divided to pass through one of the multiple particle separators, or may be arranged in series, such that the cooling fluid stream sequentially passes through multiple particle separators for the separation of increasingly smaller or finer particles at each separation stage.

Optionally, the concentrated-particle stream exiting the particle separator 86 may be passed through a heat exchanger 100 to cool the concentrated-particle stream and/or a filter 102 to remove at least some of the particles from the concentrated-particle stream, prior to being exhausted from the engine 10 or utilized in other portion of the engine 10. The filter 102 can be a line replaceable unit, and may particularly be useful if the concentrated-particle stream is to be reintroduced into the hot fluid path of the engine 10. Some non-limiting examples of a suitable filter 102 includes a ceramic filter or metallic foam filter.

As yet another option, the bypass cooling circuit 76 can include a valve 104 selectively directing the bypass cooling air to the particle separator 86, or directly to the hot portion 78 of the engine 10. The valve 104 is located within the bypass conduit 78, such that the bypass cooling air may be passed directly to the hot portion 78 while still bypassing the core 44, as well as bypassing the particle separator 86. The valve 104 may be used to turn off flow to the particle separator when particle separation is not required, such as at cruise altitudes.

Figure 3:
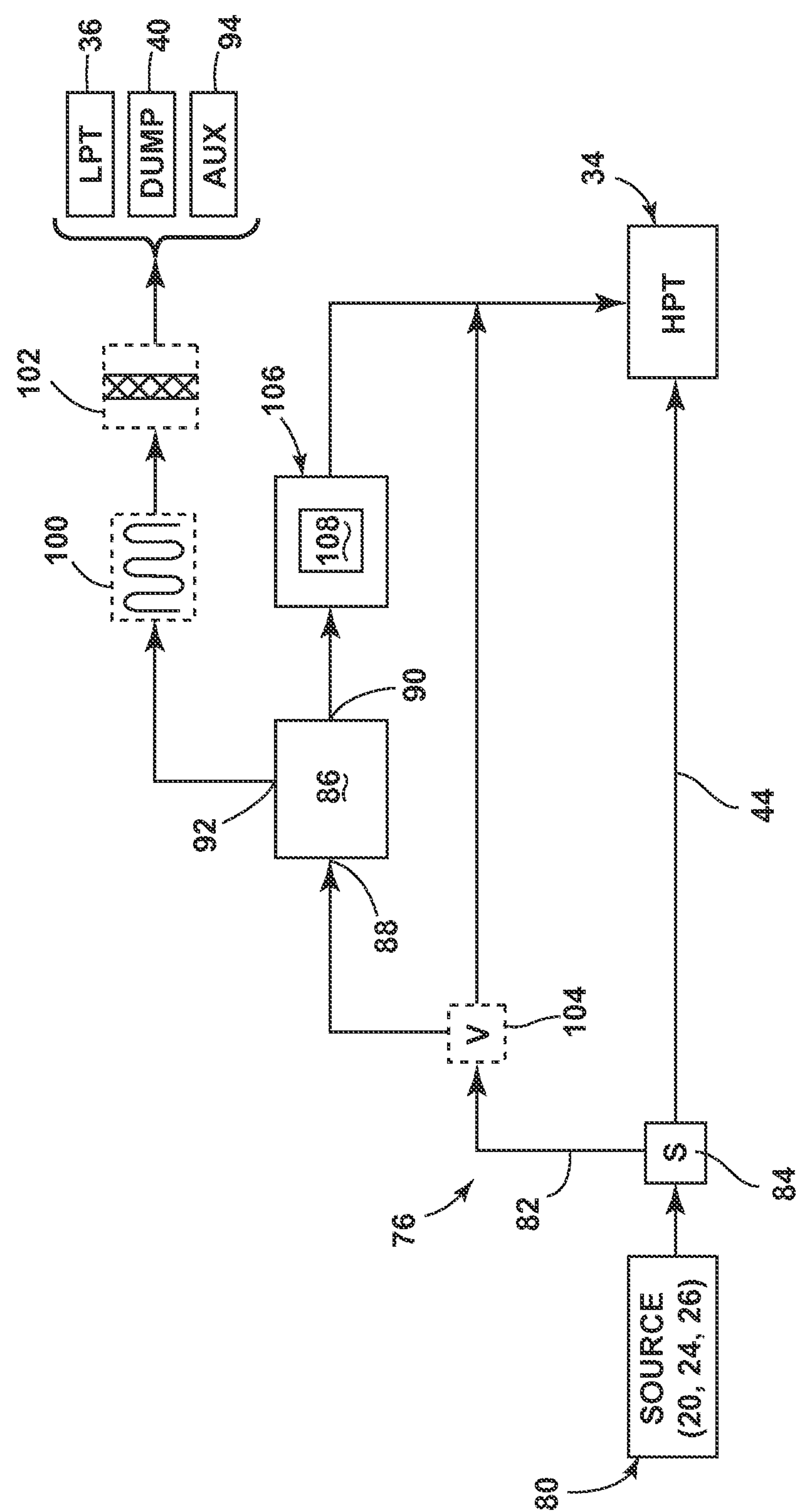
FIG. 3 is a schematic view showing a bypass cooling circuit for the engine of FIG. 1 according to a third embodiment.

FIG. 3 shows one specific configuration of the bypass cooling circuit 76 in which the reduced-particle stream can be provided to the HP turbine 34, according to a third embodiment. The bypass cooling circuit 76 can further include an inducer section 106 for injecting the reduced-particle stream into the HP turbine 34. In a typical engine 10, the inducer section 106 accelerates the cooling fluid stream and also turns the cooling fluid stream from a substantially axial direction parallel to the centerline 12 of the engine 10 to a direction generally tangential to the face of the blades 68, so as to tangentially inject the cooling fluid stream into the rotating blades 68 at a rotational or tangential speed and direction substantially equal to that of the blades 68. By "generally tangential", the cooling fluid stream may be oriented at a slightly shallow angle with respect to a true tangential direction.

In the present embodiment, the inducer section 106 can form a portion of the bypass conduit 82, and can include at least one inducer 108. The inducer section 106 can include multiple inducers 108 disposed in a circumferential array about the centerline 12 of the engine 100. Each inducer 108 can have at least one associated particle separator 86, such that each inducer 108 receives the reduced-particle flow from the associated particle separator 86.

The inducer 108 receives the reduced-particle stream from the particle separator 86 and accelerates and/or turns the reduced-particle stream so as to inject the reduced-particle stream into the rotating blades 68 of the HP turbine 34 at a velocity and direction substantially equal to that of the rotating blades 68. Fluid leaving the inducer 108 is oriented in a direction generally tangential to the face of the blades 68.

Optionally, the particle separator 86 can be configured to perform the acceleration function, while the inducer 108 may perform the turning function, with or without further acceleration of the fluid stream. The particle separator 86 can provide a fluid stream to the inducer section 106, or may be included within the inducer section 106 itself.

FIGS. 4-25 show various embodiments of panicle separators which may be incorporated into the engine 10 shown in FIG. 1, the bypass cooling circuit 76 shown in FIGS. 2-3, or an inducer section of the engine 10. It is understood that the engine 10 or bypass cooling circuit 76 may incorporate more than one of the following particle separators. Furthermore, the engine 10 or bypass cooling circuit 76 may incorporate a combination of the following particle separators.

Figure 4:
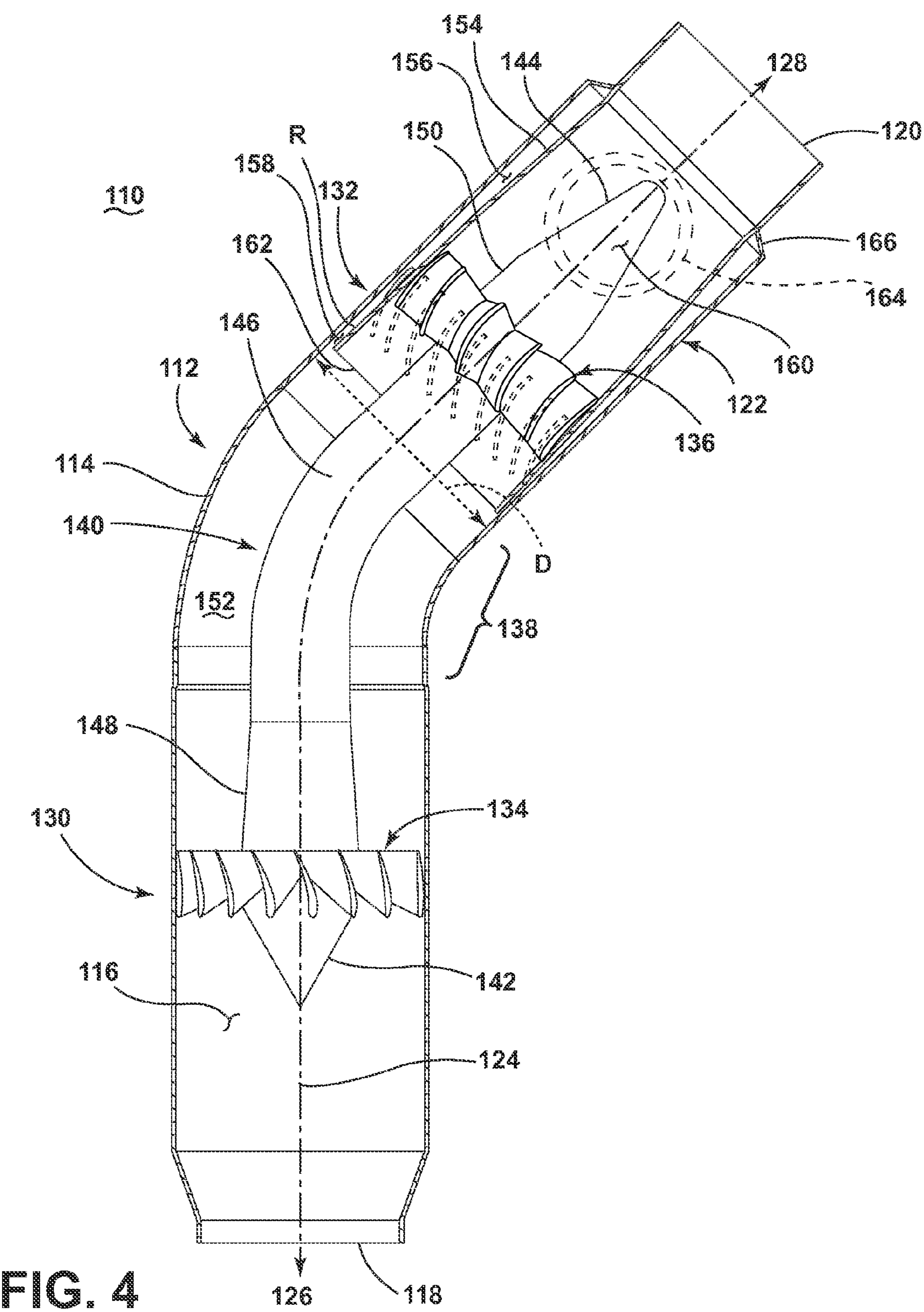
FIG. 4 is a cross-sectional view of a centrifugal separator according to a fourth embodiment.

FIG. 4 is a cross-sectional view showing a centrifugal separator 110 for removing particles from a fluid stream according to a fourth embodiment. The centrifugal separator 110 includes a body 112 having a wall 114 defining a through passage 116, with a separator inlet 118 which receives a fluid stream, a separator outlet 120 through which a reduced-particle stream is passed, and a particle outlet 122 through which a concentrated-particle stream is passed. The through passage 116 defines a centerline 124 of the centrifugal separator 110, with the centerline 124 generally defining an upstream direction 126 and downstream direction 128 with respect to the centrifugal separator 110.

The centrifugal separator 110 further includes a particle concentrator 130 and a flow splitter 132. The particle concentrator 130 of the illustrated embodiment includes an angular velocity increaser 134 provided within the through passage 116, downstream of the separator inlet 118, which is configured to impart an increased angular velocity to the incoming fluid stream. An angular velocity decreaser 136 is also provided within the through passage 116, downstream of the angular velocity increaser 134 and upstream of the separator outlet 120, and is configured to impart a decreased angular velocity to the reduced-particle stream exiting through the separator outlet 120.

A bend 138 is provided in the body 112 between the angular velocity increaser 134 and the angular velocity decreaser 136. Upstream and downstream of the bend 138, the body 112 is substantially straight or linear. The bend 138 functions as an inertial separator in combination with the centrifugal separation provided by the angular velocity increaser 134. The centerline 124 follows the bend 138, which in the illustrated embodiment defines a bend angle of approximately 45 degrees between the portions of the centerline 124 upstream and downstream of the bend 138. The separator inlet 118 and the separator outlet 120 shown herein are axially-centered on the centerline 124, but are non-axial with each other, such that the separator inlet 118 and the separator outlet 120 lie in non-parallel planes.

In this embodiment, the body 112 can define an outer body, with the wall 114 provided as an outer, annular wall. A center body 140 can be provided within the through passage 116, spaced from the annular wall 114, and can extend axially along the centerline 124 of the centrifugal separator 110. The center body 140 services to reduce pressure loss at the center region of the through passage 116.

In the illustrated embodiment, the center body 140 can extend continuously between, and beyond, the angular velocity increaser 134 and the angular velocity decreaser 136. The center body 140 includes a first terminal end 142 facing the separator inlet 118 and a second terminal end 144 facing the separator outlet 120, which are joined by a cylindrical core 146. The first terminal end 142 can be rounded to retard flow separation, while the second terminal end 144 can be tapered to reduce the cross-sectional area of the center body 140, which accelerates the fluid stream. The first terminal end 142 joins the core 146 at a first tapered portion 148 at which the angular velocity increaser 134 is located. The core 146 joins with the second terminal end 144 at a second tapered portion 150 at which the angular velocity decreaser 136 is located. The angular velocity increaser 134 and the angular velocity decreases 136 can be spaced from each other to define a separation chamber 152 therebetween forming a portion of the through passage 116 between the core 146 and the annular wall 114.

The flow splitter 132 is fluidly downstream of the particle concentrator 130, and splits the concentrated-particle stream from the reduced-particle stream. The flow splitter 132 of the illustrated embodiment includes an inner annular wall 154 spaced radially inwardly from the outer annular wall 114, which defines, at least in part, the particle outlet 122.

The particle outlet 122 includes at least one outlet passage 156 having at least one inlet opening 158 and at least one outlet opening 160. As shown, one annular outlet passage 156 is defined between the outer annular wall 114 and the inner annular wall 154, with a circumferential inlet opening 158 defined at an upstream edge 162 of the inner annular wall 154. The outlet passage 156 shown herein has an axially-increasing cross-section, such that the cross-section of outlet passage 156 at the inlet opening 158 is smaller than the cross-section of outlet passage 156 downstream of the inlet opening 158. In another configuration, the outlet passage 156 can have an axially-constant cross-section.

As shown, the outlet passage 156 includes one outlet opening 160 defined by an outlet conduit 164 projecting from the outer annular wall 114 of the centrifugal separator 110. The downstream end of the outlet passage 156 can be closed by an end wall 166 joining the outer and inner annular walls 114, 154, such that the fluid stream is directed through the outlet conduit 164, which is shown as being provided on the outer annular wall 114 upstream of the end wall 166. In other configurations, the outlet opening 160 could be provided in the end wall 166, itself.

The angular velocity decreaser 136 is located downstream of the inlet opening 158 to the outlet passage 156, with the inner annular wall 154 extending past the angular velocity decreaser 136. A portion of the inner annular wall 154 downstream of the angular velocity decreaser 136 can extend beyond the end wall 166 to define the separator outlet 120.

Alternatively, the outlet passage 156 can be provided with multiple inlet openings 158 adjacent the outer annular wall 114. In yet another alternatively, multiple outlet passages 156 can be provided, and radially spaced about the outer annular wall 114. The multiple outlet passages 156 can each have an inlet opening 158, with the inlet openings 158 being intermittent and spaced about the circumference of the body 112. Likewise, the outlet passage 156 can be provided with multiple outlet openings 160.

In one exemplary configuration, the outer annular wall 114 can define a diameter D. The inlet opening 158 of the outlet passage 156 can be located 1-20 D downstream of the angular velocity increaser 134, where the diameter D corresponds to the diameter D of the outer annular wall 114 at the inlet opening 158. Furthermore, the inlet opening 158 can define a radial segment R of 1-10% of the diameter D at the inlet opening 158. Still further, the outlet passage 156 can extend radially inwardly into the through passage 1-20% of the diameter D in the downstream direction 128. It is noted that the diameter D of the outer annular wall 114 can, as shown, be substantially continuous along at least the separation chamber 152, but it is possible for the diameter vary.

Figure 5:
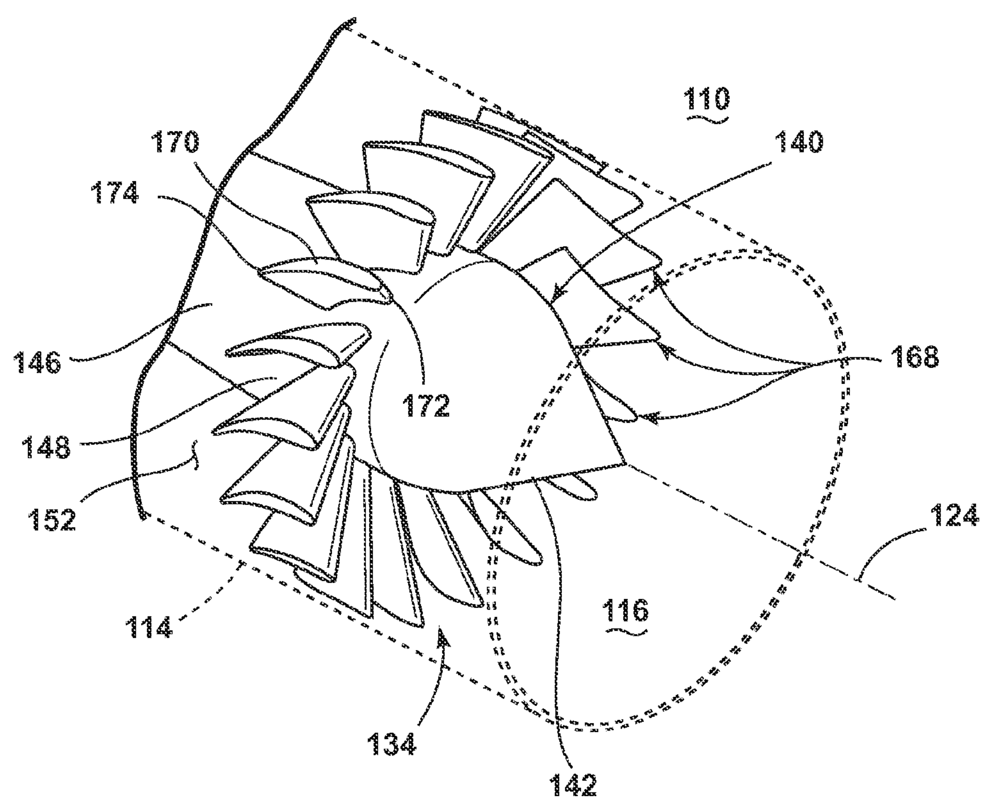
FIG. 5 is a partial perspective view of the centrifugal separator from FIG. 4, particularly showing an angular velocity increaser in greater detail.

FIG. 5 is a partial perspective view of the centrifugal separator 110 from FIG. 4, showing the angular velocity increaser 134 in greater detail. The angular velocity increaser 134 can include a plurality of swirl vanes 168 provided in the though passage 116 for imparting a swirling motion to the fluid stream. The swirl vanes 168 can be circumferentially spaced evenly about the centerline 124 of the through passage 116. The swirl vanes 168 can further be fixed in position within the through passage 116, such that they remain stationary as fluid passes the swirl vanes 168. Other structures, such as a screw-type vane, may be used.

As illustrated, each swirl vane 168 can comprise an airfoil-shaped body 170 with a rounded leading edge 172 followed by a tapered trailing edge 174 which is downstream of the leading edge 172. The airfoil-shaped bodies 170 are cambered such that the leading edges 172 deflect the incoming fluid stream in a swirling flow, thereby generating a vortex or swirling flow about the center body within the separation chamber 152. The trailing edges 174 are oriented in generally the same direction in which it is desired to swirl the fluid stream.

The swirl vanes 168 can extend radially from the center body 140 to the annular wall 114. More particularly, the rounded leading edges 172 can be located slightly downstream of the first terminal end 142 of the center body 140, with the airfoil-shaped bodies 170 being located on the first tapered portion 148.

Figure 6:
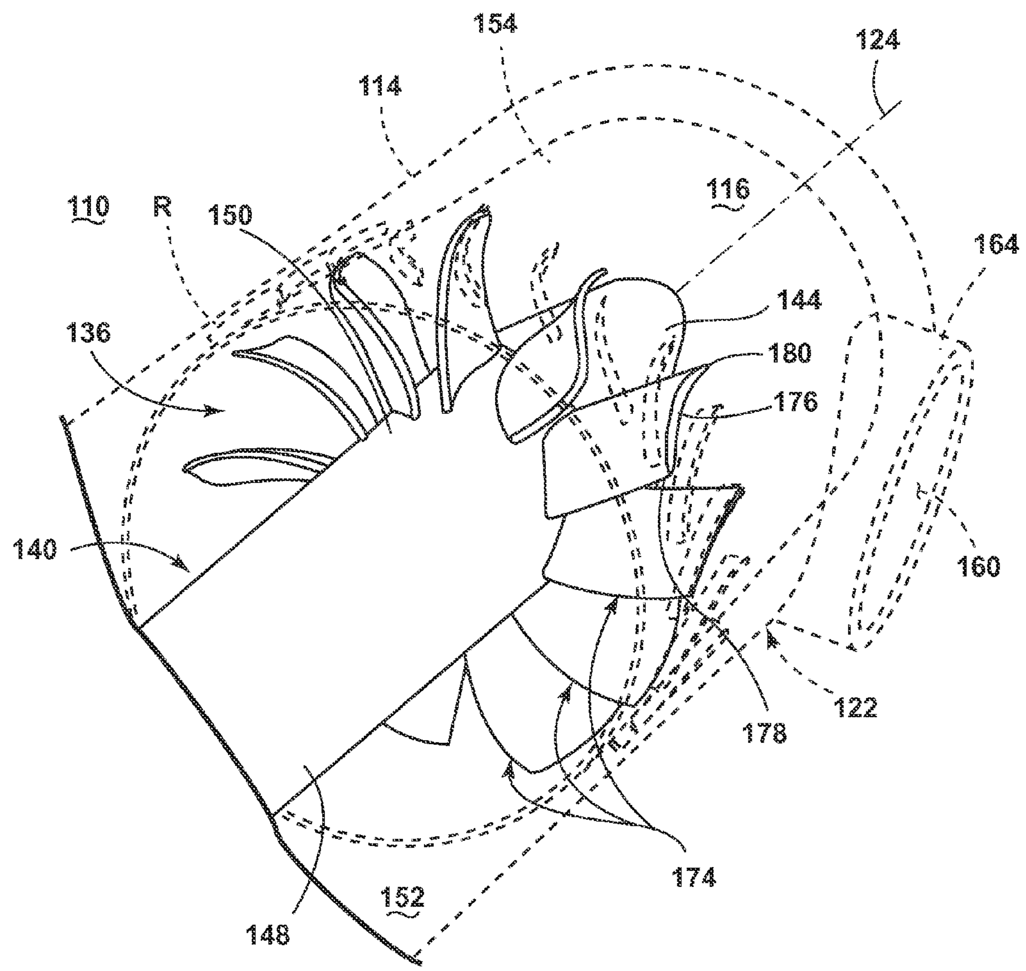
FIG. 6 is a partial perspective view of the centrifugal separator from FIG. 4, particularly showing an angular velocity decreaser in greater detail.

FIG. 6 is a partial perspective view of the centrifugal separator 110 from FIG. 4, showing the angular velocity decreaser 136 in greater detail. The angular velocity decreaser 134 can include a plurality of deswirl vanes 174 provided in the though passage 116 for straightening the fluid stream and substantially reducing or removing any swirl from the reduced-particle stream. The deswirl vanes 174 can be circumferentially spaced evenly about the centerline 124 of the through passage 116. The deswirl vanes 174 can further be fixed in position within the through passage 116, such that they remain stationary as fluid passes the deswirl vanes 174.

As illustrated, each deswirl vane 174 can comprise an airfoil-shaped body 176 with a leading edge 178 followed by a trailing edge 180 which is downstream of the leading edge 178. The airfoil-shaped bodies 176 are cambered such that the leading edges 178 are directed in generally the same direction as the swirling air flow entering the angular velocity decreaser 136 from the separation chamber 152, while the trailing edges 180 are directed substantially in the direction in which it is desired for the flow to exit the vanes 174, i.e., with little or no swirl component of velocity.

The deswirl vanes 174 can extend radially from the center body 140 to the inner annular wall 154. More particularly, the trailing edge 180 can be located slightly upstream of the second terminal end 144 of the center body 140, with the airfoil-shaped bodies 176 being located on the second tapered portion 150.

Figure 7:
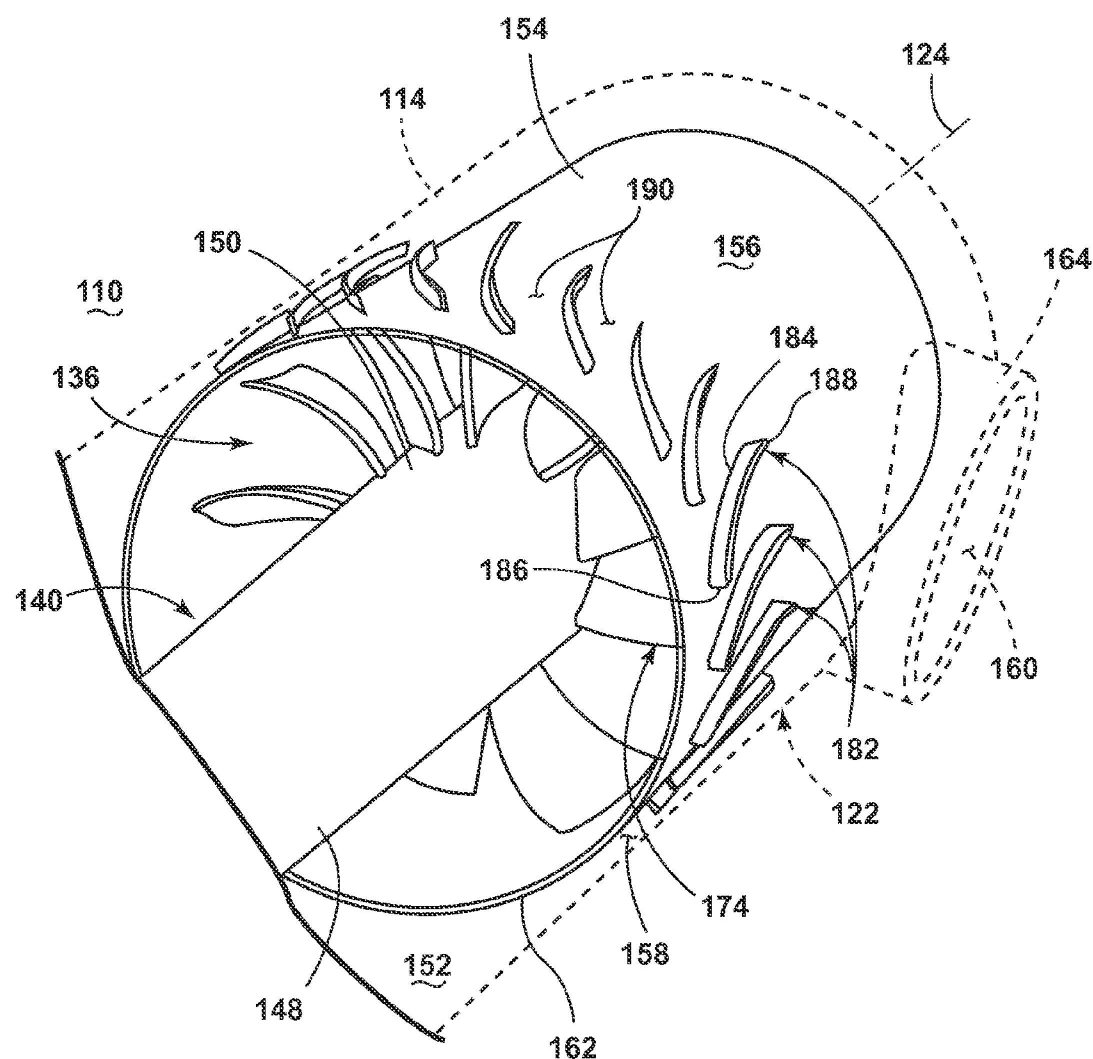
FIG. 7 is a partial perspective view of the centrifugal separator from FIG. 4, particularly showing an outlet passage in greater detail.

FIG. 7 is a partial perspective view of the centrifugal separator 110 from FIG. 4, showing the outlet passage 156 in greater detail. The outlet passage 156 can include a plurality of vanes 182 for deswirling the flow. The vanes 182 can be circumferentially spaced evenly about the centerline 124 within the outlet passage 156, and can further be fixed in position within the outlet passage 156, such that the vanes 182 remain stationary as the concentrated-particle stream passes the vanes 182. The vanes 182 can extend radially from the inner annular wall 154 to the outer annular wall 114, and are upstream of the outlet conduit 164.

As illustrated, each vane 182 can comprise a cambered body 184 with a leading edge 186 followed by a trailing edge 188 which is downstream of the leading edge 186. The cambered bodies 184 are oriented such that the flow entering the outlet opening 158 is deswirled and define separate inlet paths 190 through the outlet passage 156 between adjacent vanes 182.

Figure 8:
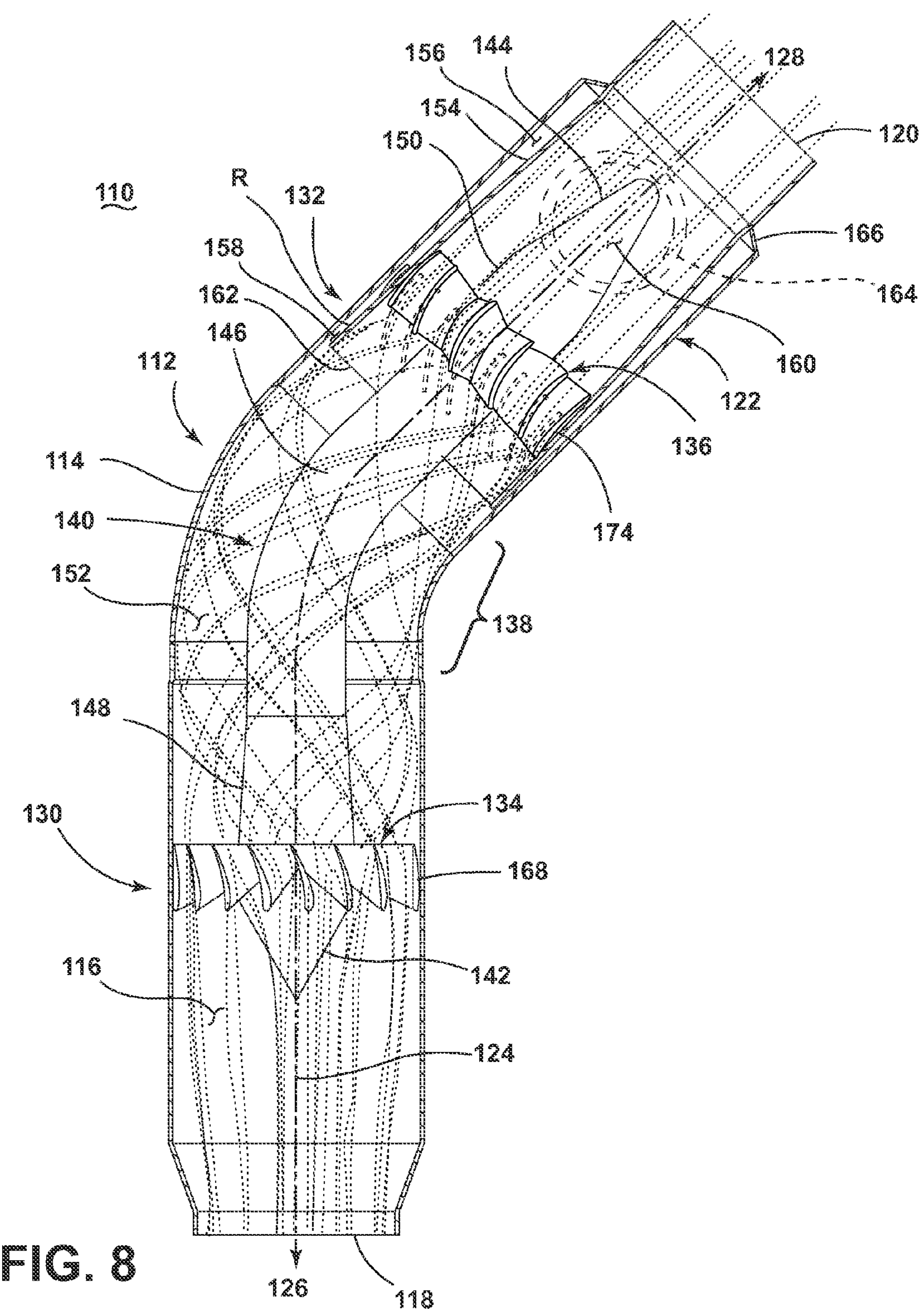
FIG. 8 is a view similar to FIG. 4 showing the fluid flow through the centrifugal separator during operation.

FIG. 8 is a view similar to FIG. 4 showing the fluid flow through the centrifugal separator 110. In operation, a fluid stream enters the separator inlet 118 in a substantially axial direction with respect to the centerline 124, and the swirl vanes 168 impart a swirling flow to the incoming fluid stream, thereby generating a vortex within the separation chamber 152. Due to their greater inertia, particles within the vortex are forced radially outwardly toward the outer wall 114. The flow splitter 132 splits a radially-outward portion of the fluid stream along with entrained particles within the radially-outward portion from a radially-inward portion of the fluid stream to form a concentrated-particle stream and a reduced-particle stream. The reduced-particle stream passes within the inner annular wall 154 and through the separator outlet 120. The concentrated-particle stream leaves the separator 110 by passing outside the inner annular wall 154 and through the outlet opening 160. It is noted that for purposes of simplification, the streamlines for the concentrated-particle stream are not shown in FIG. 8.

The angular velocity increaser 134 and the angular velocity decreaser 136 can be configured to respectively increase and decrease the angular velocity of the fluid stream by substantially opposite amounts. In particular, the swirl vanes 168 are oriented relative to the fluid stream, which generally enters the separator inlet 118 in an axial direction following the centerline 124, to increase the angular velocity of the fluid stream as the fluid stream passes through the swirl vanes 168. Correspondingly, the deswirl vanes 174 are oriented relative to the fluid stream, which generally approaches the angular velocity decreaser 136 in a swirling motion around the centerline 124, to decrease the angular velocity of the reduced-particle fluid stream by substantially the same amount as the swirl vanes 168 increased the angular velocity 174.

Figure 9:
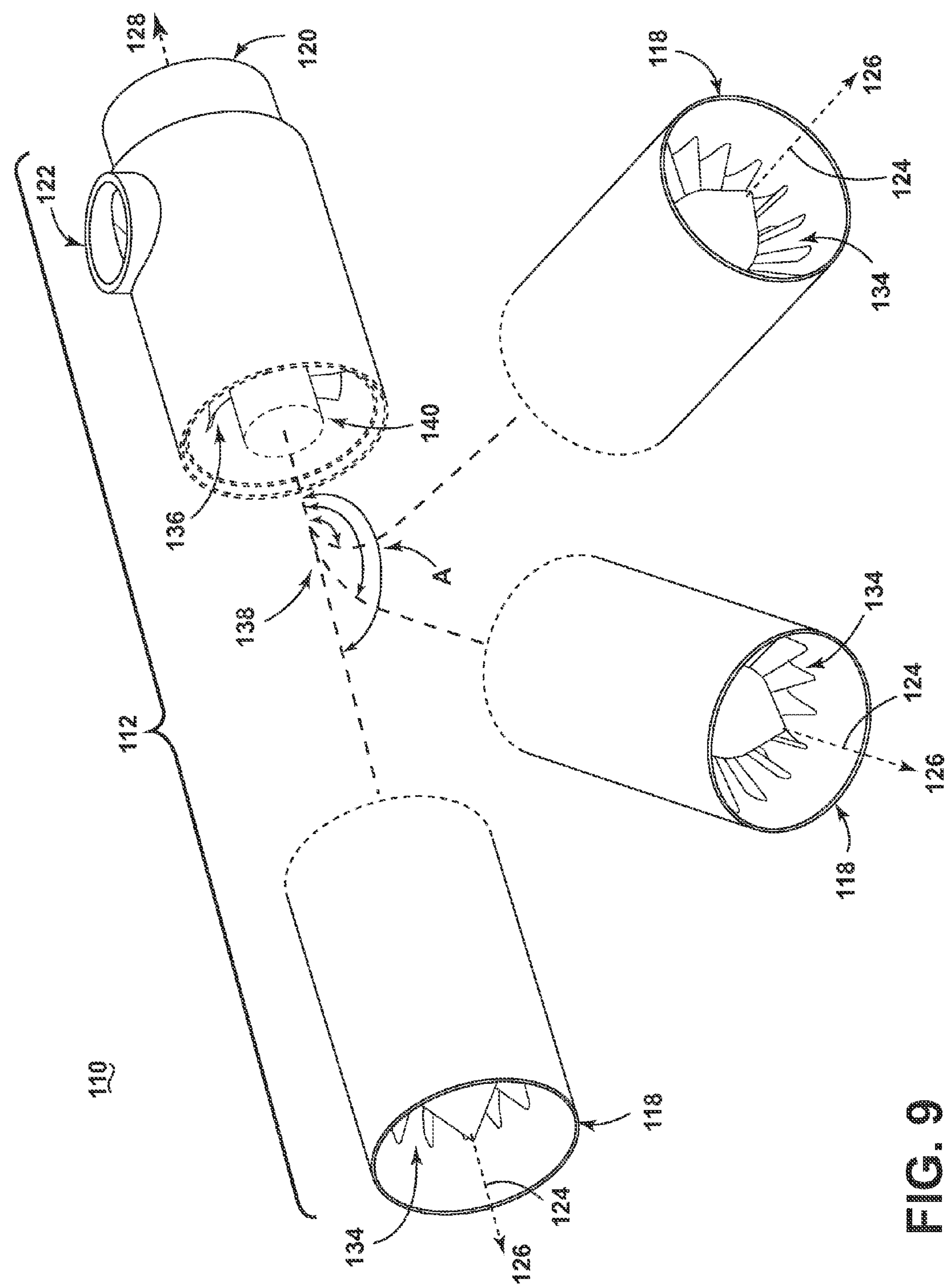
FIG. 9 is a schematic view of the centrifugal separator of FIG. 4, illustrating some other exemplary configurations.

FIG. 9 is a schematic view of the centrifugal separator 110 of FIG. 4, illustrating some other exemplary configurations of the bend 138. Upstream and downstream of the bend 138, the body 112 is substantially straight or linear. The centerline 124 follows the bend 138, which in the illustrated embodiment defines bend angle A between the portions of the centerline 124 upstream and downstream of the bend 138. The centrifugal separator 110 can, for example, be configured to have a bend 138 with bend angle A ranging from greater than zero but less than or equal to 90 degrees. It is noted that the angle A can by in plane and out of plane and form a compound angle in three dimensions.

Furthermore, the centrifugal separator 110 can be provided with a continuous center body 140, similar to what is shown in FIG. 4 in which the center body 140 extends continuously between the angular velocity increaser 134 and the angular velocity decreaser 136, or can alternatively be provided with a non-continuous center body, in which the center body 140 has at least one discontinuously between the angular velocity increaser 134 and the angular velocity decreaser 136; some examples of this are shown in the following figures.

Figure 10:
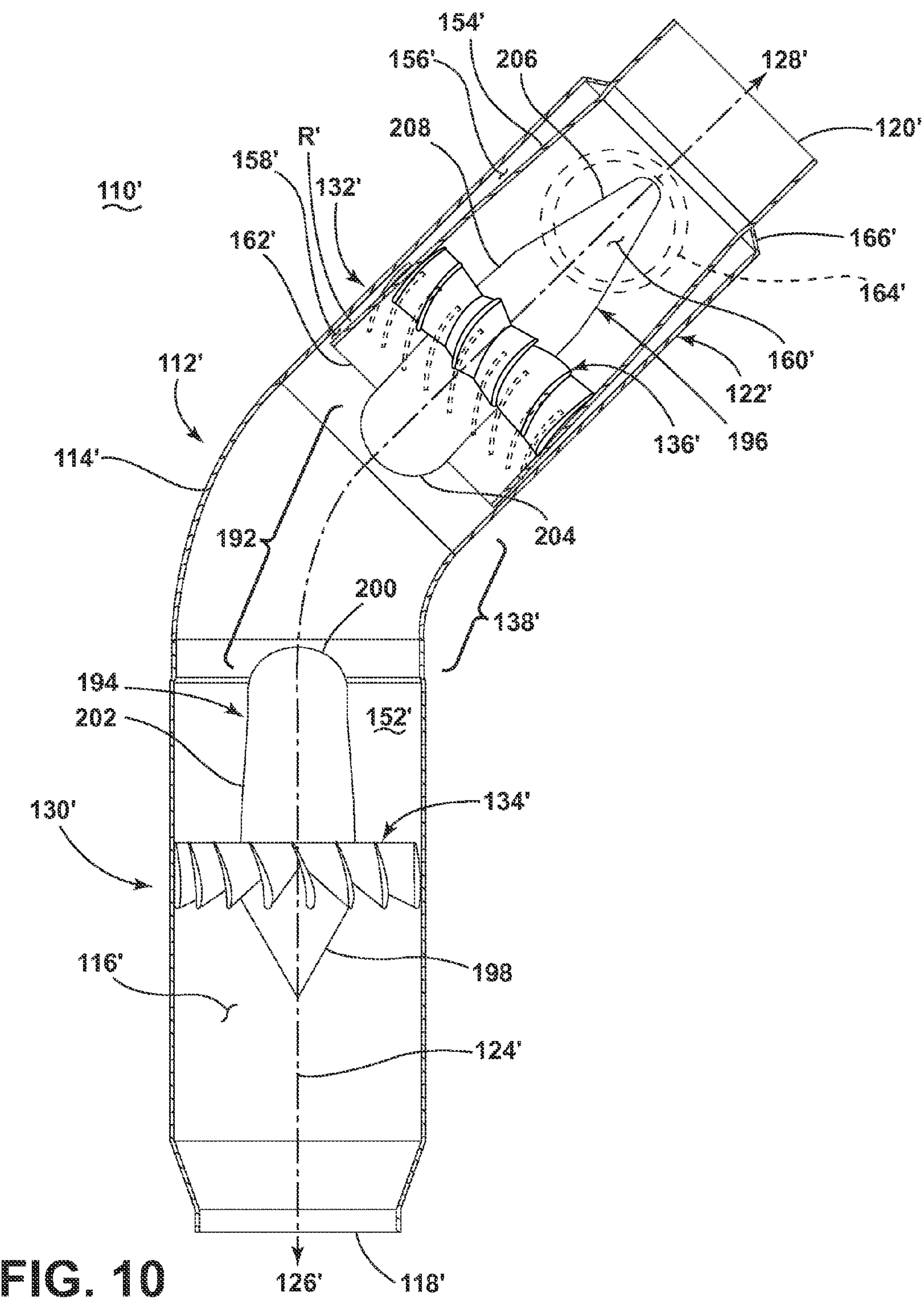
FIG. 10 is a cross-sectional view showing a centrifugal separator according to a fifth embodiment.

FIG. 10 is a cross-sectional view showing a modified version of a centrifugal separator 110' according to a fifth embodiment, in which elements in common with the centrifugal separator 110 of FIG. 4 are referred to by the same reference numerals bearing a prime (') symbol. The centrifugal separator 110' differs from the centrifugal separator 110 of FIG. 4 by including a non-continuous center body 192, which is typically easier to manufacture and assemble, along with weighing less and having lower costs. The non-continuous center body 192 can be provided within the through passage 116', spaced from the annular wall 114', and can extend axially along the centerline 124' of the centrifugal separator 110'. In the illustrated embodiment, the center body 192 extends non-continuously between, and beyond, the angular velocity increaser 134' and the angular velocity decreaser 136'.

The non-continuous center body 192 includes leading body 194 and a trailing body 196 which is downstream of and separate from the leading body 194. The leading body 194 includes a first terminal end 198 facing the separator inlet 118' and a second terminal end 200 facing the separation chamber 152', which joins the first terminal end 198 at a tapered portion 202 at which the angular velocity increaser 134' is located. The first terminal end 198 can be tapered, while the second terminal end 200 can be rounded or tapered. The trailing body 196 includes a first terminal end 204 facing the separation chamber 152' and a second terminal end 206 facing the separator outlet 120', which joins the first terminal end 204 at a tapered portion 208 at which the angular velocity decreaser 136' is located. The first terminal end 204 can be rounded or tapered, while the second terminal end 206 can be tapered.

Figure 11:
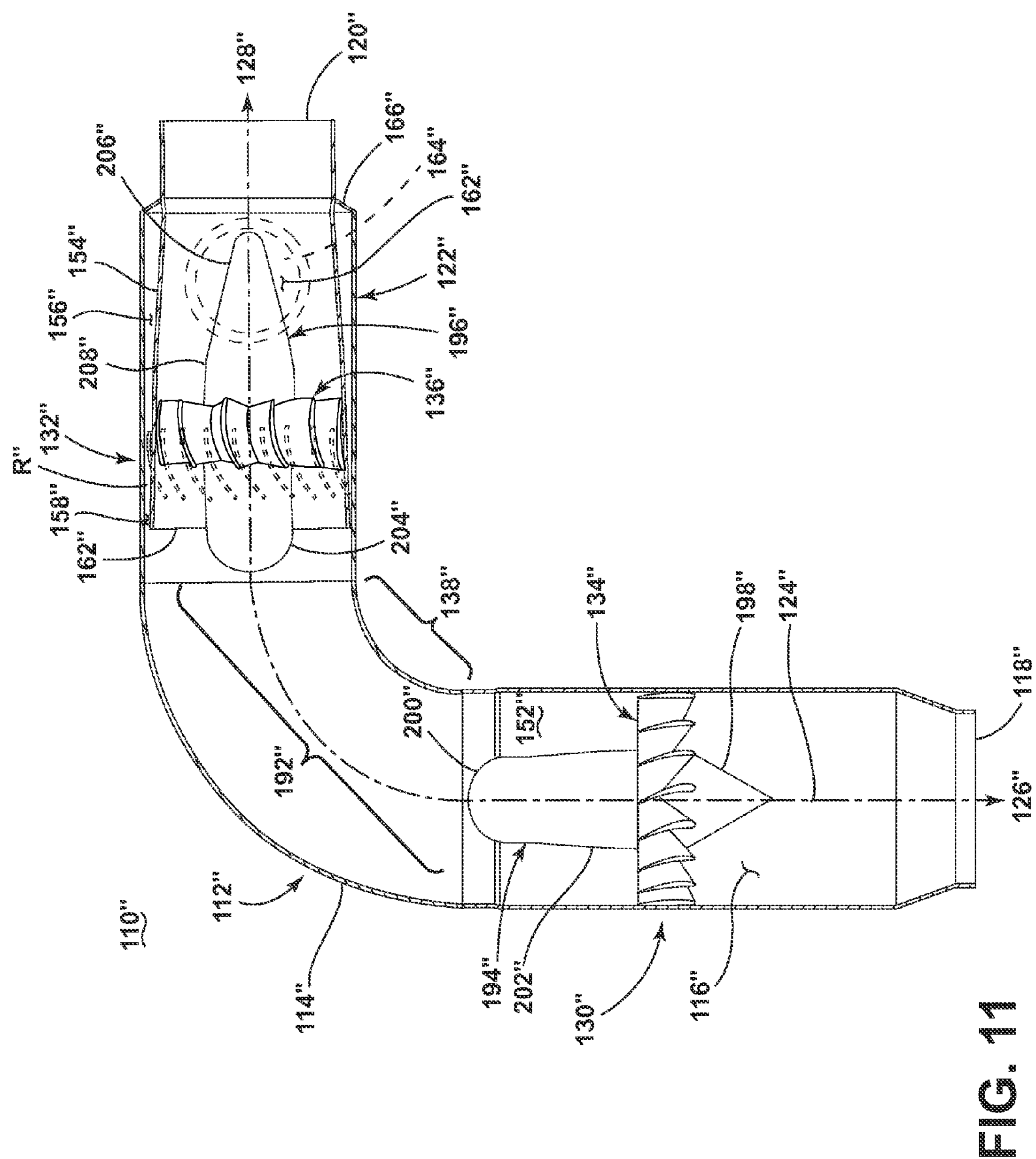
FIG. 11 is a cross-sectional view showing a centrifugal separator according to a sixth embodiment.

FIG. 11 is a cross-sectional view showing yet another modified version of a centrifugal separator 110" according to a sixth embodiment, in which elements in common with the centrifugal separator 110' of FIG. 10 are referred to by the same reference numerals bearing a double prime (") symbol. The centrifugal separator 110" differs from the centrifugal separator 110' of FIG. 10 by including a bend 138" of substantially 90 degrees, which provides for greater inertial separation as well as improving case of installation in some environments.

Figure 12:
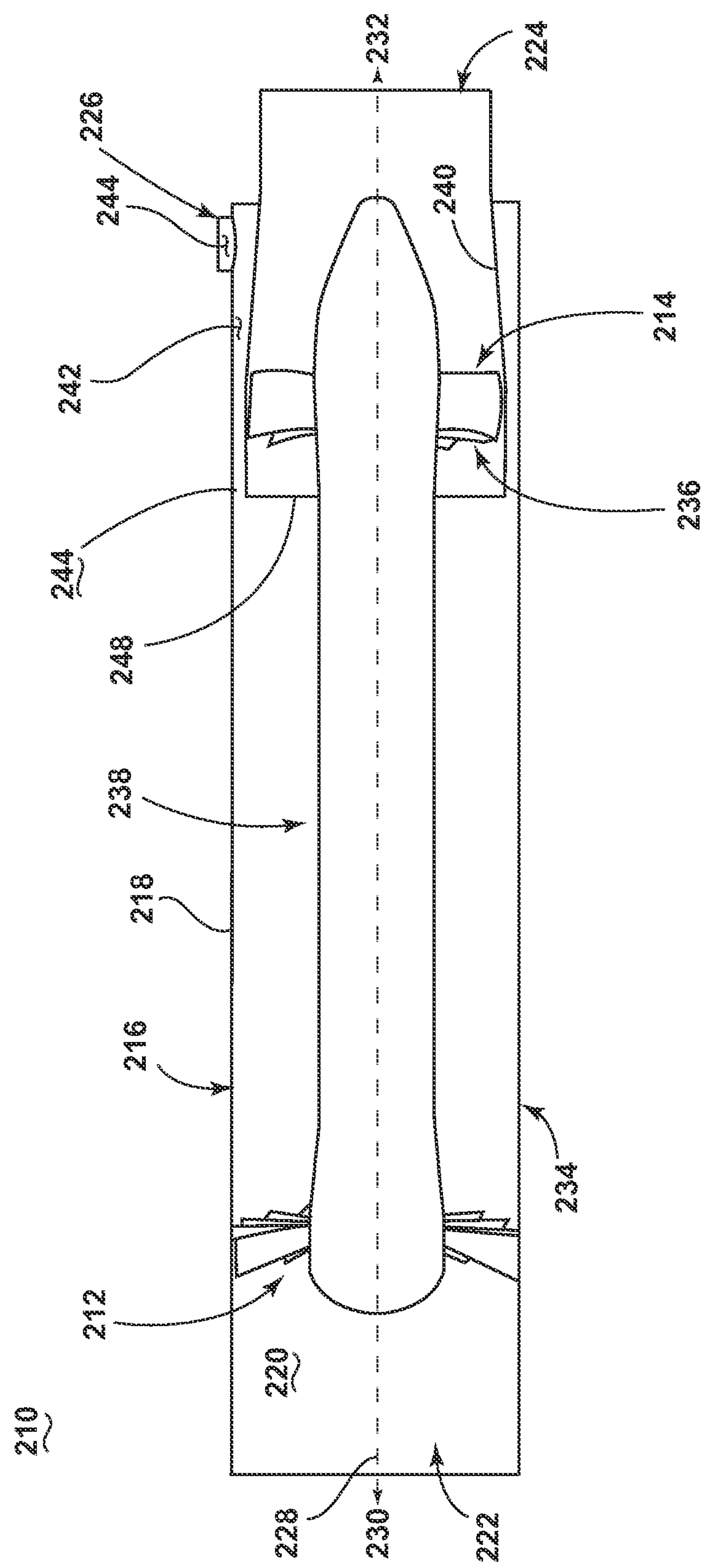
FIG. 12 is a cross-sectional view showing a centrifugal separator according to a seventh embodiment.

FIG. 12 is a cross-sectional view showing yet another modified version of a centrifugal separator 210 according to a seventh embodiment. The centrifugal separator 210 differs from the centrifugal separators 110, 110', 110" of FIGS. 4-11 by the elimination of any bend between an angular velocity increaser 212 and an angular velocity decreaser 214 of the separator 210.

The centrifugal separator 210 includes a body 216 having a wall 218 defining a through passage 220, with a separator inlet 222 which receives a fluid stream, a separator outlet 224 through which a reduced-particle stream is passed, and a particle outlet 226 through which a concentrated-particle stream is passed. The through passage 220 defines a centerline 228 of the centrifugal separator 210, with the centerline 228 generally defining an upstream direction 230 and downstream direction 232 with respect to the centrifugal separator 210. The centrifugal separator 210 shown in FIG. 12 is an axial-flow separator, with the separator inlet 222 and separator outlet 224 co-axially aligned and lying along the centerline 228 defined by the through passage 220. The centrifugal separator 210 further includes a particle concentrator 234, which includes the angular velocity increaser 212, and a flow splitter 236.

In this embodiment, the body 216 can define an outer body, with the wall 218 provided as an outer, annular wall. A center body 238 can be provided within the through passage 220, spaced from the outer annular wall 218, and can extend axially along the centerline 228. The angular velocity increaser 212 and angular velocity decreaser 214 are located on the center body 238. Further, the angular velocity increaser 212, angular velocity decreaser 214, and center body 238 can be configured substantiantially as described above for the angular velocity increaser 134, angular velocity decreaser 136, and center body 140 of FIG. 4.

The flow splitter 236 is fluidly downstream of the particle concentrator 234, and splits the concentrated-particle stream from the reduced-particle stream. The flow splitter 236 of the illustrated embodiment includes an inner annular wall 240 spaced radially inwardly from and formed integrally with, the outer annular wall 218, which defines, at least in part, the particle outlet 226.

The particle outlet 226 includes at least one outlet passage 242 having at least one inlet opening 244 and at least one outlet opening 246. As shown, one annular outlet passage 242 is defined, with a circumferential inlet opening 244 defined at an upstream edge 248 of the inner annular wall 240 and one outlet opening 246 defined in the outer annular wall 218 and extending in a radial direction. The outlet passage 242 shown herein has an axially-increasing cross-section, such that the cross-section of outlet passage 242 at the inlet opening 244 is smaller than the cross-section of outlet passage 242 downstream of the inlet opening 244. In another configuration, the outlet passage 242 can have an axially-constant cross-section. Also as shown, the outlet passage 242 is free from any vanes, although vanes 182 similar to those shown in FIG. 7 could also be incorporated in this embodiment.

Figure 13:
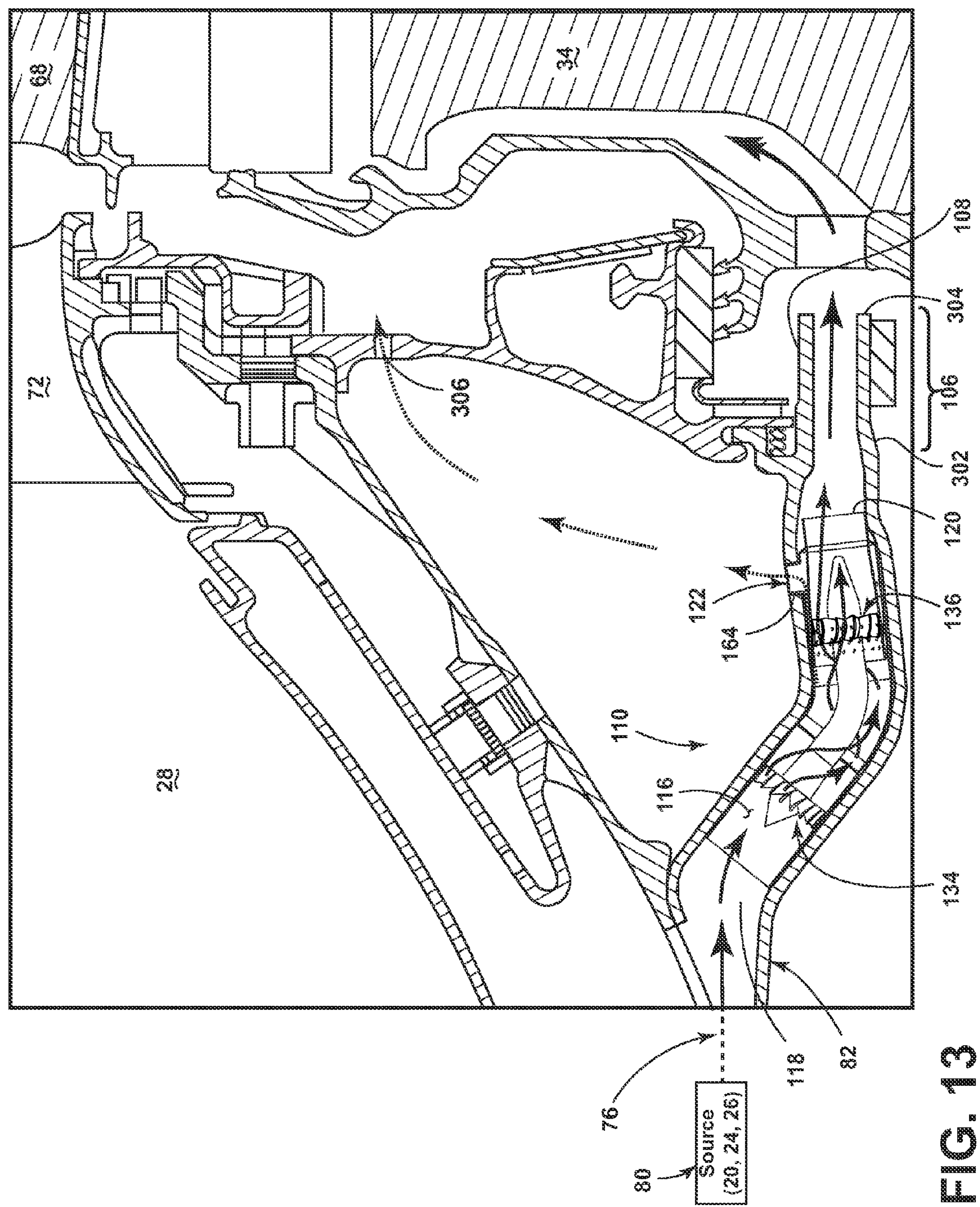
FIG. 13 is a schematic view of a section of the engine from FIG. 1, showing the centrifugal separator of FIG. 4 incorporated with an inducer section of the engine, according to an eighth embodiment.

FIG. 13 is a schematic view of a section of the engine 10, showing the centrifugal separator 110 of FIG. 4 incorporated with the inducer section 106, according to an eighth embodiment. As described above, with reference to FIG. 3, the inducer section 106 can form a portion of the bypass conduit 82 of the bypass cooling circuit 76, and can include at least one inducer 108. The inducer 108 includes an inducer inlet 302 and an inducer outlet 304. The separator outlet 120 of the centrifugal separator 110 can be located upstream of the inducer 108 and can be in fluid communication with the inducer inlet 302, such that the fluid stream supplied to the inducer 108 is a reduced-particle stream. The inducer 108 accelerates and/or turns the reduced-particle stream and injects the reduced-particle stream into the HP turbine 34.

The concentrated-particle stream from the centrifugal separator 110 is not directed to the inducer 108 or HP turbine 34, but rather is passed from the particle outlet 122 through an extraction vent 306. Alternatively, the concentrated-particle stream may be directed toward the rotor wheel space in the HP turbine. The extraction vent 306 can lead to the LP turbine 36, an exhaust for the engine 10 under the fan casing 40, or to another portion of the engine 10 to be used for some auxiliary function 94, as indicated schematically in FIG. 3.

Figure 14:
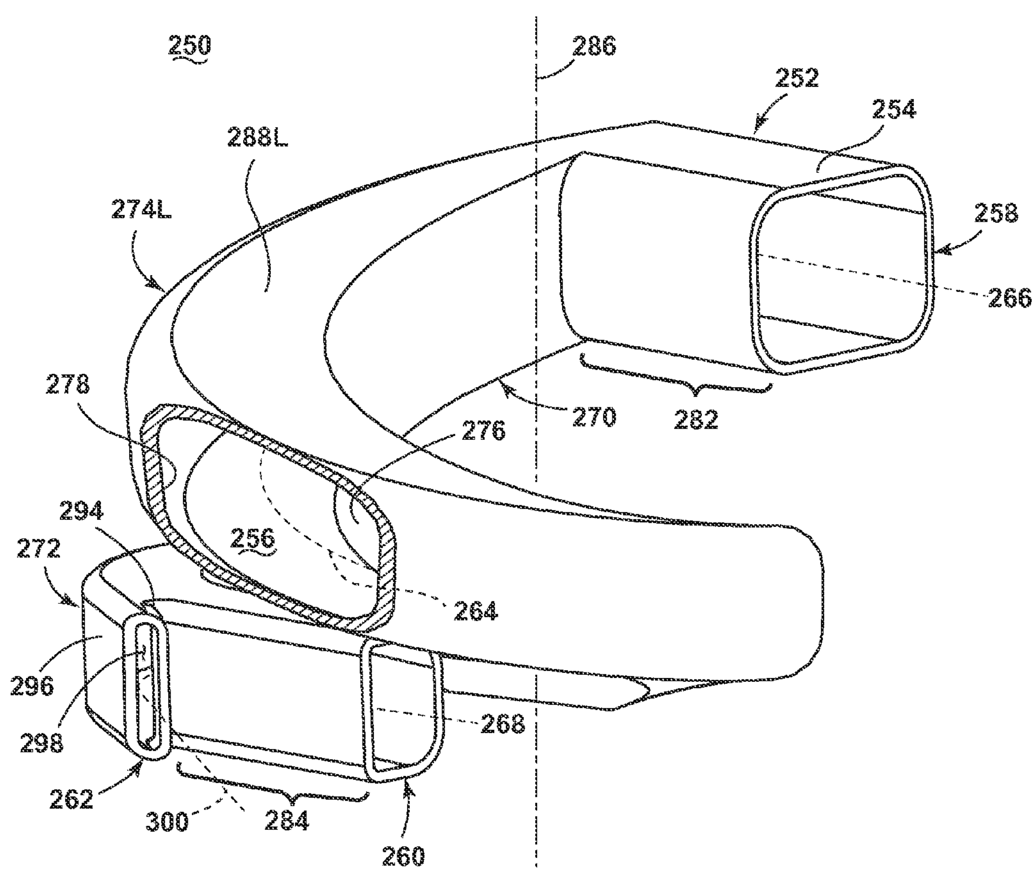
FIG. 14 is a first perspective view showing an inertial separator for removing particles from a fluid stream according to a ninth embodiment.
Figure 15:
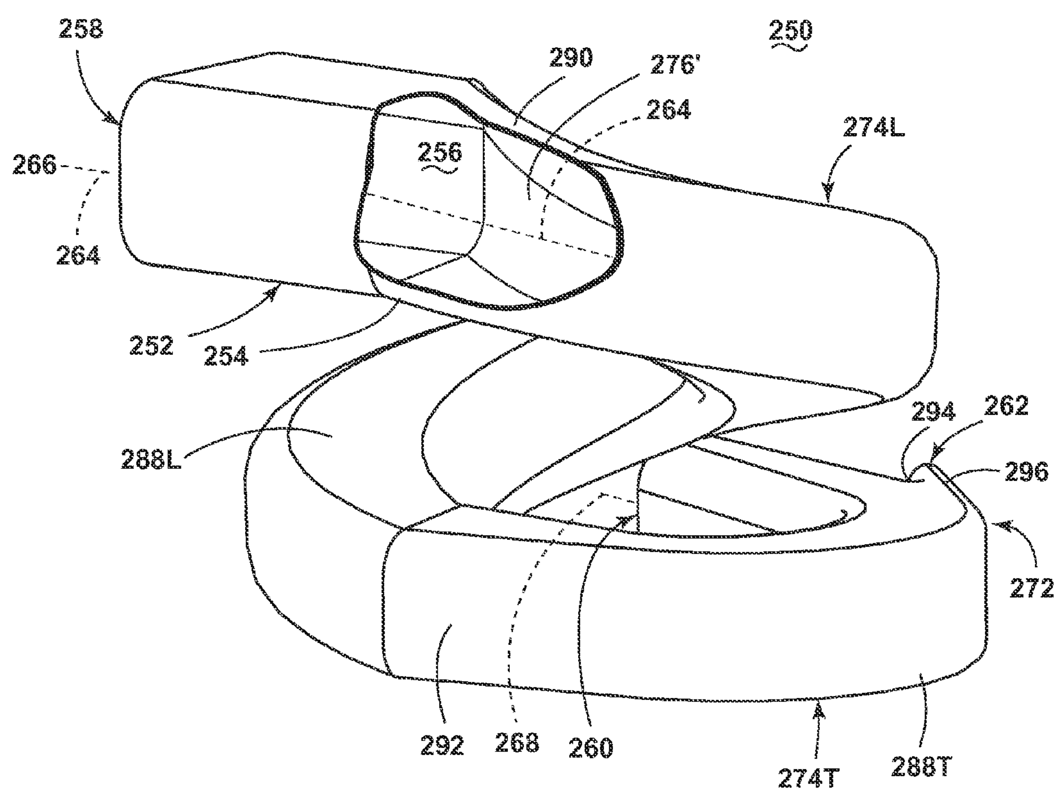
FIG. 15 is a second perspective view showing the inertial separator of FIG. 14.

FIGS. 14-15 are perspective views showing an inertial separator 250 for removing particles from a fluid stream according to a ninth embodiment. The inertial separator 250 includes a body 252 having a wall 254 defining a through passage 256, with at least one separator inlet 258 which receives a fluid stream, at least one separator outlet 260 through which a reduced-particle stream is passed, and at least one particle outlet 262 through which a concentrated-particle stream is passed. The through passage 256 defines a centerline 264 of the inertial separator 250, with the centerline 264 generally defining an upstream direction 266 and downstream direction 268 for fluid flow. In FIGS. 14-15, a portion of the wall 254 is cut-away to better show the through passage 256.

The inertial separator 250 further includes a particle concentrator 270 and a flow splitter 272 fluidly downstream of the particle concentrator 270. The particle concentrator 270 of the illustrated embodiment includes at least one torn 274 provided in the body 252 between the at least one separator inlet 258 and the at least one separator outlet 260. The at least one turn 274 defines an inside 276 and outside 278 for the through passage 256. The at least one turn 274 forces the fluid stream passing through the through passage 256 to change direction, and the inertia of at least some of the particles within the fluid stream causes the particles to move toward the outside 278 of the through passage 256. The flow splitter 272 splits the radially-outward portion of the fluid stream, i.e. the portion of the fluid stream closer to the outside 278, from the radially-inward portion of the fluid stream, i.e. the portion of the fluid stream closer to the inside 276, to form the concentrated-particle stream, which is passed through the particle outlet 262, and the reduced-particle stream, which is passed through the separator outlet 260.

In this embodiment, the wall 254 of the body 252 can be a tubular wall defining a conduit having a substantially rectilinear cross-sectional shape. Other cross-sectional shapes are also possible, such as annular. The tubular wall 254 is substantially hollow or free from obstructions, such that a fluid stream entering the inertial separator 250 flows axially along the centerline 264, until reaching the flow splitter 272.

An inlet portion 282 of the tubular wall 254 defines the separator inlet 258, and an outlet portion 284 of the tubular wall 254 defines the separator outlet 260. The inlet and outlet portions 282, 284 can be substantially straight, with the centerline 264 of the through passage 256 at the inlet and outlet portions 282, 284 being substantially linear.

The at least one turn 274 can be defined with respect to a turn axis 286, such that the centerline 264 of the through passage 256 winds about the turn axis 286 at the one turn 274. The body 252 can therefore include at least one winding portion 288 of the tubular wall 254 to define the at least one turn 274. At the winding portion 288, the centerline 264 can follow various forms of curves. For example, the centerline 264 at the winding portion 288 can follow a plane curve or a space curve. In another example, the radius of the at least one turn 274, defined as the distance between the centerline 264 and the turn axis 286 can be constant or changing along the winding portion 288, including increasing or decreasing in the downstream direction 268. In yet another example, the pitch of the at least one turn 274, defined as the angle between the centerline 264 and the turn axis 286 at a given point along the centerline 264, can be constant or changing along the winding portion 288, including increasing or decreasing in the downstream direction 268. Some non-limiting examples of shapes for the winding portion 288 in which the centerline 264 follows a space curve include corkscrew, helical and spiral.

The at least one turn 274 can further be configured to effect differing degrees of direction change in the fluid stream. In one example, the at least one turn 274 effects at least a 45 degree change of direction of the fluid stream; more preferably, the at least one turn effects at least a 180 degree change of direction of the fluid stream, still more preferably, the at least one turn effects at least a 360 degree change of direction of the fluid stream.

The at least one turn 274 can further be configured to impart a Stokes number to the fluid stream which will force at least some of the particles entrained in the fluid stream to move to the outside of the through passage. In one example, the at least one turn 274 can further be configured to impart a Stokes number of 0.01 to 20 to the fluid stream.

The particle concentrator 270 of the inertial separator 250 can further include multiple, discrete turns, as shown in FIG. 15. The particle concentrator 270 in particular includes a leading turn 274L which is downstream of the inlet portion 282 and a trailing turn 274T which is downstream of the leading turn 274L. In the illustrated embodiment, the first turn 274L effects at least a 360 degree change in the direction of the fluid stream entering the inertial separator 250 at the separator inlet 258, while the second turn 274T effects at least a 90 degree change in the direction of the fluid stream. The conduit 282 can therefore include a leading winding portion 288L defining the leading turn 274L and a trailing winding portion 288T defusing the trailing turn 274T, both of which wind about the turn axis 286.

The portion of the tubular wall 254 forming the particle concentrator 270 can further have a constant or changing cross-sectional area. In the illustrated embodiment, a first transition portion 290 defines a decreasing cross-sectional area of the tubular wall 254 leading into the leading turn 274L. A second transition portion 292 defines a further decreasing cross-sectional area of the tubular wall 254 leading into the trailing turn 274T. The decrease in cross-sectional area serves to accelerate the fluid stream, to segregate the finer particle to the outer wall for extraction at 262.

The flow splitter 272 of the illustrated inertial separator 250 more particularly includes a bifurcation 294 in the tubular wall 254, which divides the tubular wall 254 into the outlet portion 284 defining the separator outlet 260, and branch conduit 296 defining an outlet passage 298 forming the particle outlet 262. The outlet passage 298 is provided at the outside 278 of the through passage 256, such that particles entrained in the fluid stream flowing along the outside of the through passage 256 are carried into the outlet passage 298. In another configuration, the branch conduit 296 can be eliminated, such that the particle outlet 262 is formed as an opening or port in the outer side of the tubular wall 254.

Figures 16, 17:
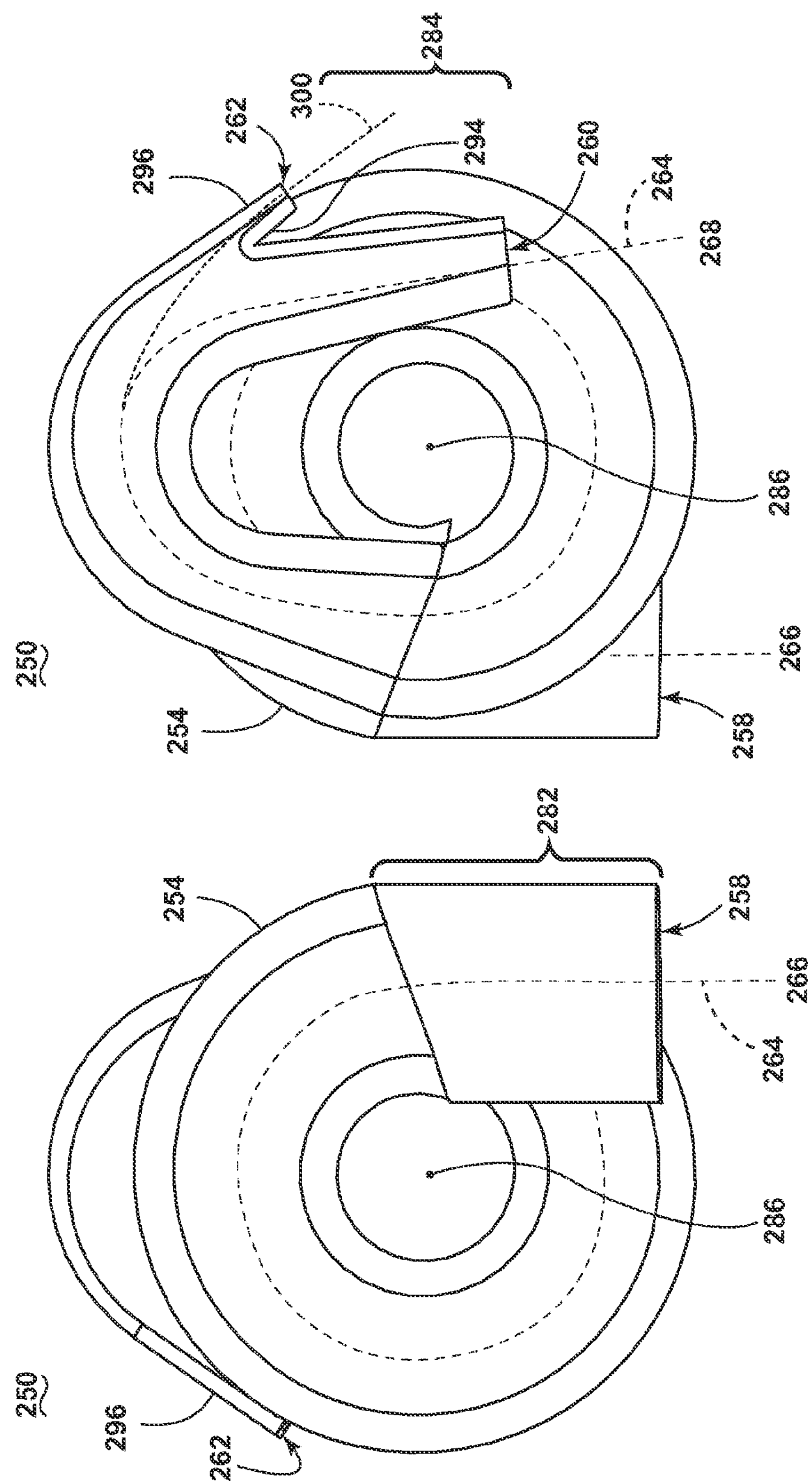
FIG. 16 is a top view of the inertial separator from FIG. 14.
FIG. 17 is a bottom view of the inertial separator from FIG. 14.

FIGS. 16-17 are a top and a bottom view, respectively, of the inertial separator 250 from FIG. 14. As noted above, the centerline 264 follows the various turns and transitions of the inertial separator 250, and may be substantially straight or linear at the inlet portion 282 and outlet portion 284 of the tubular wall 254. The branch conduit 296 can define a centerline 300 which tangentially intersects the centerline 264 of the separator outlet 260.

Figure 18:
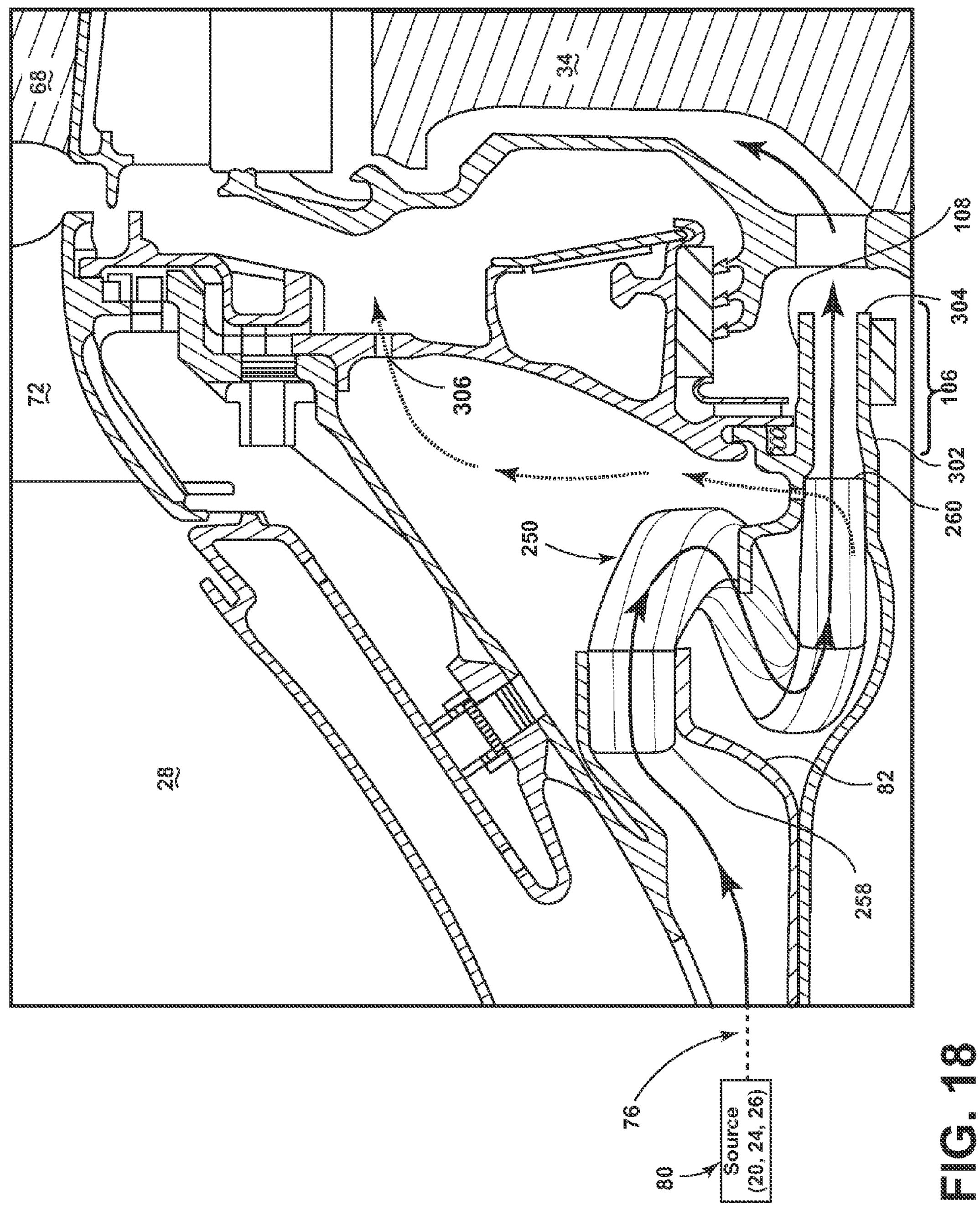
FIG. 18 is a schematic view of a section of the engine from FIG. 1, showing the inertial separator of FIG. 14 incorporated with an inducer section of the engine, according to a tenth embodiment.

FIG. 18 is a schematic view of a section of the engine 10, showing the inertial separator 250 of FIG. 14-17 incorporated with the inducer section 106. As described above, the inducer section 106 can form a portion of the bypass conduit 82 of the bypass cooling circuit 76, and can include at least one inducer 108. The separator outlet 260 of the inertial separator 250 can be located upstream of the inducer 108 and can be in fluid communication with the inducer inlet 302, such that the fluid stream supplied to the inducer 108 is a reduced-particle stream. The inducer 108 accelerates and/or turns the reduced-particle stream and injects the reduced-particle stream into the HP turbine 34. As described above, the inertial separator 250 can be configured to accelerate the reduced-particle stream as well. The concentrated-particle stream from the inertial separator 250 is not directed to the inducer 108 or turbine 34, but rather is passed from the particle outlet 262 (not visible in FIG. 18, see FIG. 14) through the extraction vent 306.

Figure 19:
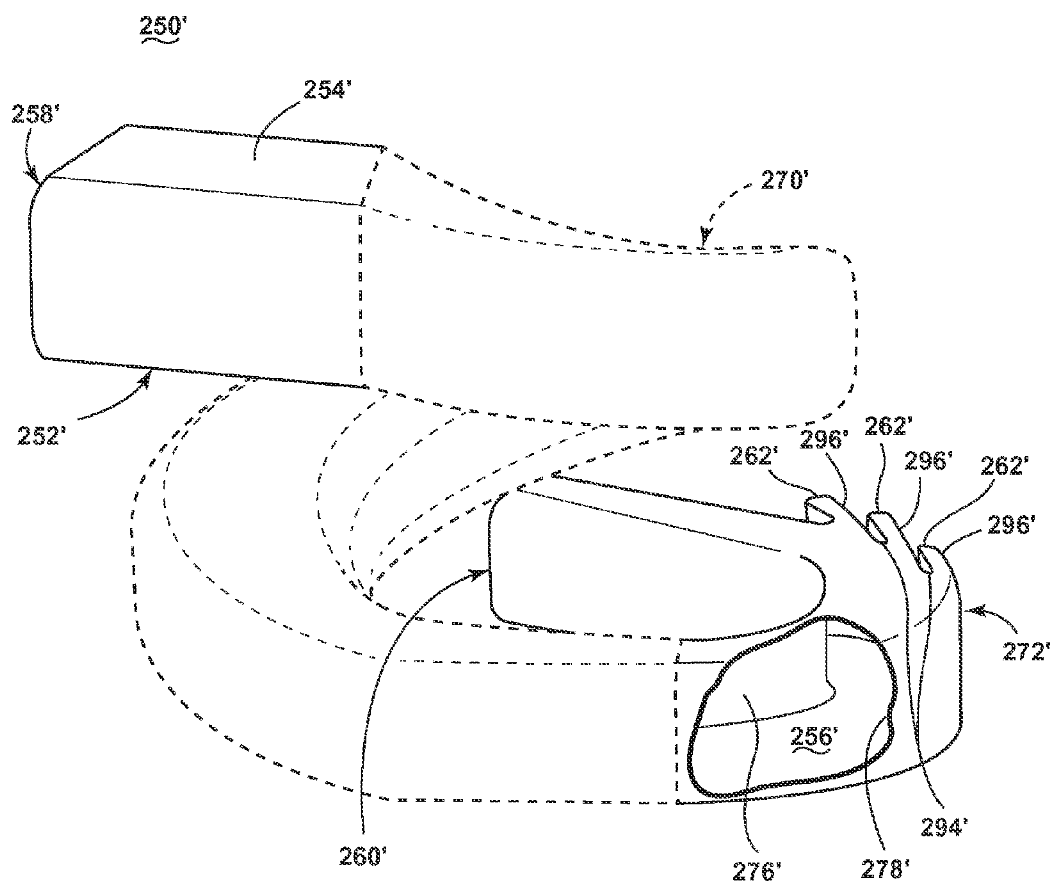
FIG. 19 is a schematic view showing a modified version of an inertial separator according to an eleventh embodiment.

FIG. 19 is a schematic view showing a modified version of an inertial separator 250' according to an eleventh embodiment, in which elements in common with the inertial separator 250 of FIG. 14-17 are referred to by the same reference numerals bearing a prime (') symbol. The inertial separator 250' differs from the inertial separator 250 of FIG. 14 by including a flow splitter 272' with multiple particle outlets 262'. The particle outlets 262' are disposed along the outside 278' of the through passage 256', with multiple bifurcations 294' and branch conduits 296' correspondingly provided.

The inertial separator 250' can be used with the inducer section 106 as shown in FIG. 18. The particle outlets 262' be in fluid communication with one or portion portions of the engine, such that concentrated-particle stream from the inertial separator 250' to one or more portions of the engine 10. For example, one particle outlet 262' can be in fluid communication with the LP turbine 36, another particle outlet 262' can be in fluid communication with the exhaust for the engine 10 under the fan casing 40, and yet another particle outlet 262' can be in fluid communication with another portion of the engine 10 to be used for some auxiliary function 94, as indicated schematically in FIG. 3. The listing of possible places to direct the concentrated-particle stream is not limiting. Other suitable places, such as into the high pressure rotor wheel space is a possible location.

Furthermore, a center portion of the tubular wall 254' is illustrated in dotted line to depict that there are numerous configurations for the particle concentrator 270'. For example, the particle concentrator 270' can include varying combinations and configurations of turns and transition portions, as described above. In another example, the inertial separator 250'can include multiple separator inlets 258' and/or multiple separator outlets 260', in addition to the multiple particle outlets 262' as shown.

Figure 20:
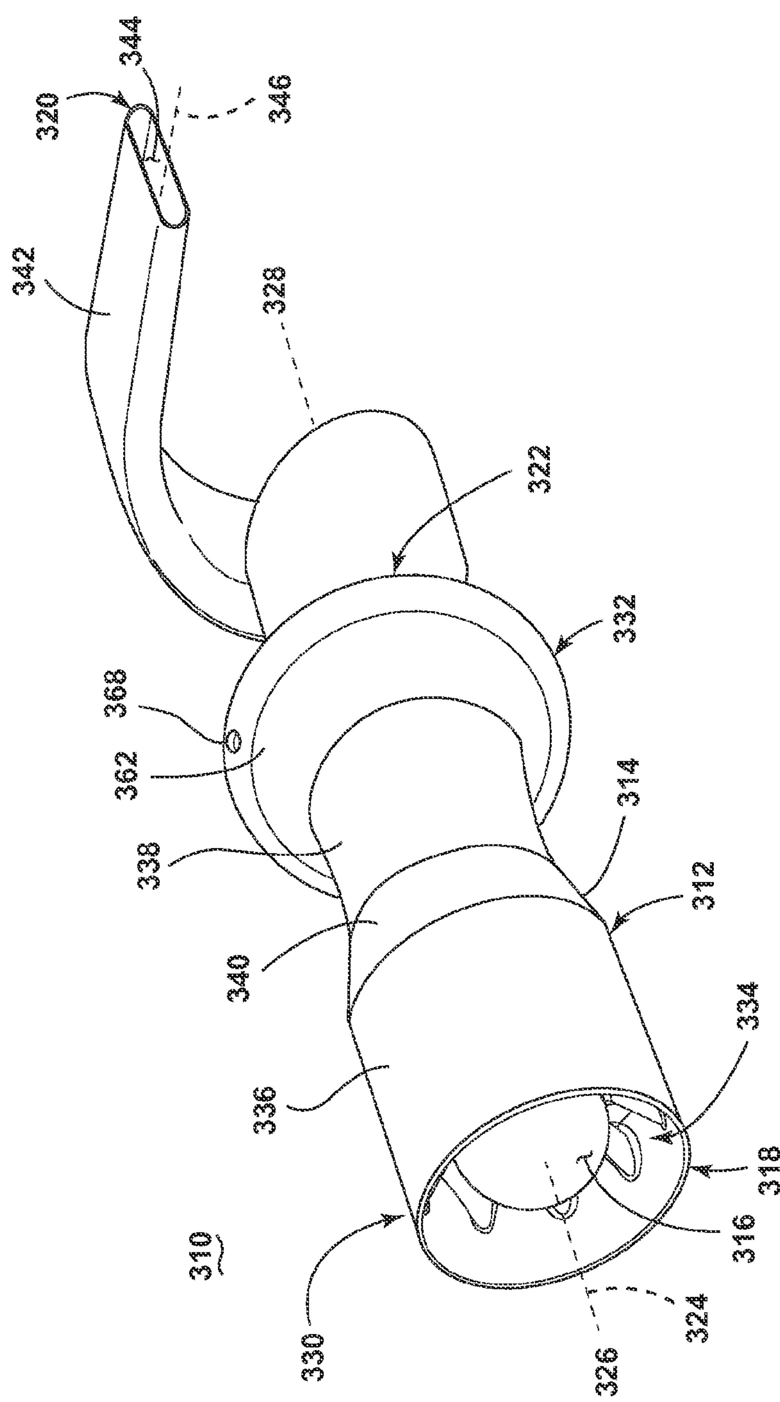
FIG. 20 is a perspective view showing a centrifugal separator for removing particles from a fluid stream according to a twelfth embodiment.

FIG. 20 is a perspective view showing a centrifugal separator 310 for removing particles from a fluid stream according to a twelfth embodiment. The centrifugal separator 310 includes a body 312 having a wall 314 defining a through passage 316, with a separator inlet 318 which receives a fluid stream, a separator outlet 320 through which a reduced-particle stream is passed, and a particle outlet 322 through which a concentrated-particle stream is passed. The through body 312 generally defines a centerline 324 of the centrifugal separator, with the centerline further generally defining an upstream direction 326 and downstream direction 328 with respect to the centrifugal separator 310.

The centrifugal separator 310 further includes a particle concentrator 330 and a flow splitter 332. The particle concentrator 330 of the illustrated embodiment includes an angular velocity increaser 334 provided within the through passage 316, downstream of the separator inlet 318, which is configured to impart an increased angular velocity to the incoming fluid stream.

In this embodiment, the body 312 can define an outer body, with the wall 314 provided as an outer, annular wall. The outer, annular wall 314 includes a leading cylindrical portion 336 defining the separator inlet 318, which is tapered to trailing cylindrical portion 338 having a smaller diameter by frusto-conical portion 340, which necessarily need not be a frusto-conical portion 340. Other shapes are possible, such as a constant radius portion.

The separator outlet 320 of the illustrated embodiment includes an exit conduit 342 fluidly coupled to the body 312, downstream of the angular velocity increaser 334 and the flow splitter 332. The exit conduit 342 is shaped to substantially preserve either the angular velocity relative to the body centerline 324 or the tangential velocity relative to the engine centerline 12, including the speed and vector, of the reduced-particle stream as the reduced-particle stream is emitted through the separator outlet 320.

In the illustrated example, the exit conduit 342 includes at least one turn which is configured to substantially follow the vector of the reduced-panicle stream provided by the angular velocity increaser 334. The at least one turn can define a winding centerline 346 for the exit conduit 342. In the illustrated embodiment, the winding centerline 346 follows a path which wraps at least partially around the centerline 324 defined by the through passage 316. The exit conduit 342 can therefore define a winding passage 344 extending from the trailing cylindrical portion 338.

At the winding passage 344, the winding centerline 346 can follow various forms of curves. For example, the winding centerline 346 can follow a plane curve or a space curve. In another example, the radius of the winding passage 344, defined as the distance between the centerline 324 and the winding centerline 346 can be constant or changing along the exit conduit 342, including increasing in the downstream direction. In yet another example, the pitch of the winding passage 344, defined as the angle between the centerline 324 and the winding centerline 346 at a given point along the centerline 324, can be constant or changing along the exit conduit 342, including decreasing in the downstream direction. Some non-limiting examples of shapes for the winding passage 344 in which the winding centerline 346 follows a space curve include corkscrew, helical and spiral. The space curve followed by the winding centerline 346 can follow the streamline for a vector that substantially preserves either the angular velocity relative to the body centerline 324 or the tangential velocity relative to the engine centerline 12 of the reduced-particle stream.

Figure 21:
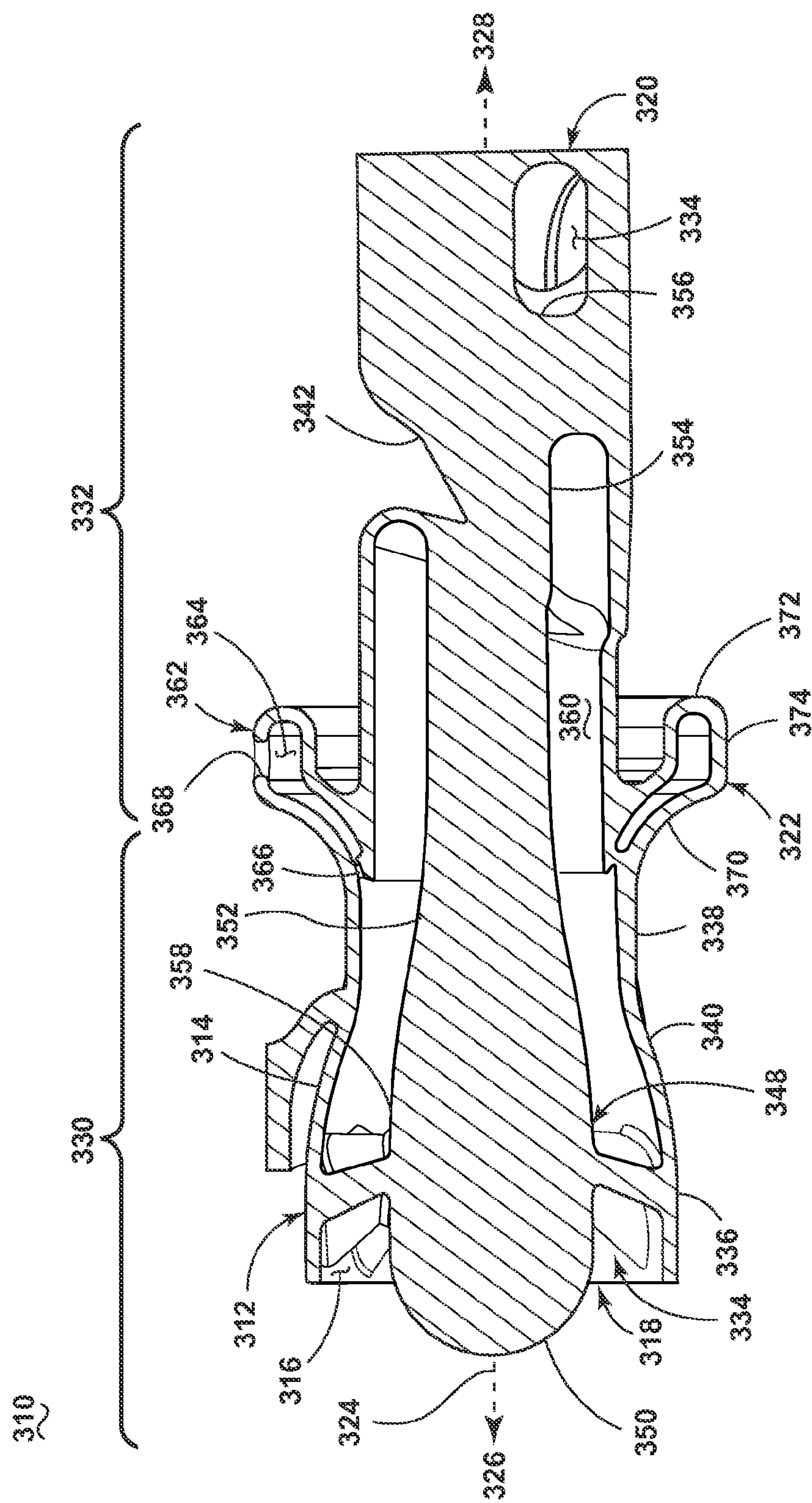
FIG. 21 is a cross-sectional view of the centrifugal separator from FIG. 20.

FIG. 21 is a cross-sectional view of the centrifugal separator 310 from FIG. 20, taken along the centerline 324. A center body 348 can be provided within the through passage 316, spaced from the annular wall 314, and can extend axially along the centerline 324 of the centrifugal separator 310.

In the illustrated embodiment, the center body 348 can extend continuously between the angular velocity increaser 334 and the flow splitter 332. The center body 348 includes a first terminal end 350 extending toward, and in some cases may extend beyond, the separator inlet 318, and a second terminal end 352, which are joined by a cylindrical core 354. The first terminal end 350 can be rounded, while the second terminal end 352 can extend to a closed end wall 356 of the centrifugal separator 310. The angular velocity increaser 334 can be spaced from the end wall 356 to define a separation chamber 360 therebetween forming a portion of the through passage 316 between the core 354 and the annular wall 314.

The flow splitter 332 is fluidly downstream of the particle concentrator 330, and splits the concentrated-particle stream from the reduced-particle stream. The flow splitter 332 of the illustrated embodiment includes an annular chamber 362 spaced radially outwardly from the annular wall 314, which defines, at least in part the particle outlet 322. The particle outlet 322 further includes at least one outlet passage 364 having at least one inlet opening 366 and at least one outlet opening 368, with the inlet opening 366 extending radially inwardly from the annular wall 314.

As shown, the annular chamber 362 includes a leading wall 370 and a trailing wall 372 which project radially from the annular wall 314 and are joined by an outer wall 374. One annular outlet passage 364 is defined by the annular chamber 362, with a circumferential inlet opening 366 extending around the annular wall 314 and one outlet opening 368 formed in the outer wall 374. The leading and trailing walls 370, 372 define the inlet opening 366, which extends circumferentially around the annular wall 314. Alternatively multiple, separate inlet or outlet openings 366, 368 can be provided. Furthermore, one or more non-annular outlet passages 364 can be provided.

The outlet passage 364 shown herein has an axially-increasing cross-section, such that the cross-section of outlet passage at the inlet opening is smaller than the cross-section of outlet passage downstream of the inlet opening, in another configuration, the outlet passage can have an axially-constant cross-section or axially decreasing cross section.

Figure 22:
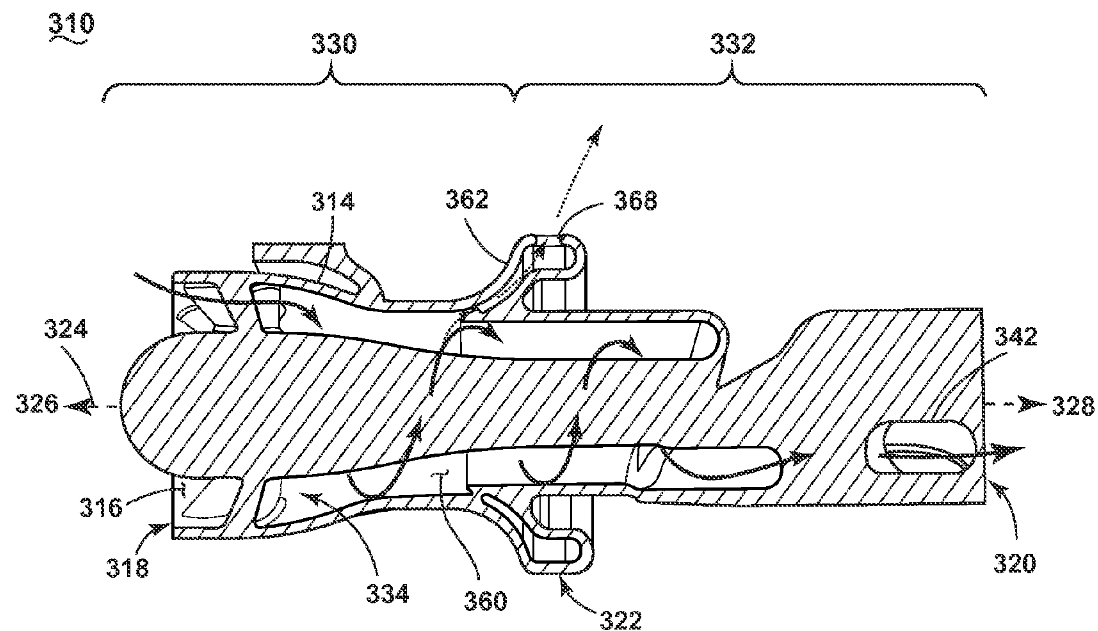
FIG. 22 is a view similar to FIG. 21 showing the fluid flow through the centrifugal separator during operation.

FIG. 22 is a view similar to FIG. 21 showing the fluid flow through the centrifugal separator 310 during operation. In operation, a fluid stream enters the separator inlet 318 in a substantially axial direction with respect to the centerline 324, and the angular velocity increaser 334 imparts a swirling flow to the incoming fluid stream, thereby generating a vortex and/or s swirling flow within the separation chamber 360. The angular velocity increaser 334 is configured to increase the angular velocity of the fluid stream as the fluid stream passes through the through passage 316, thereby increasing the centrifugal force acting on entrained particles in the fluid stream to urge the entrained particles toward the outer wall 314. The flow splitter 332 splits a radially-outward portion of the fluid stream along with entrained particles within the radially-outward portion from a radially-inward portion of the fluid stream to form a concentrated-particle stream (illustrated by dotted line) and a reduced-particle stream. The exit conduit 342 receives the reduced-particle stream and substantially preserves either the angular velocity relative to the body centerline 324 or the tangential velocity relative to the engine centerline 12, including the speed and vector, of the reduced-particle stream as the reduced-particle stream is emitted through the separator outlet 320. The concentrated-particle stream passes into the annular chamber 362 and through the particle outlet 322.

Figure 23:
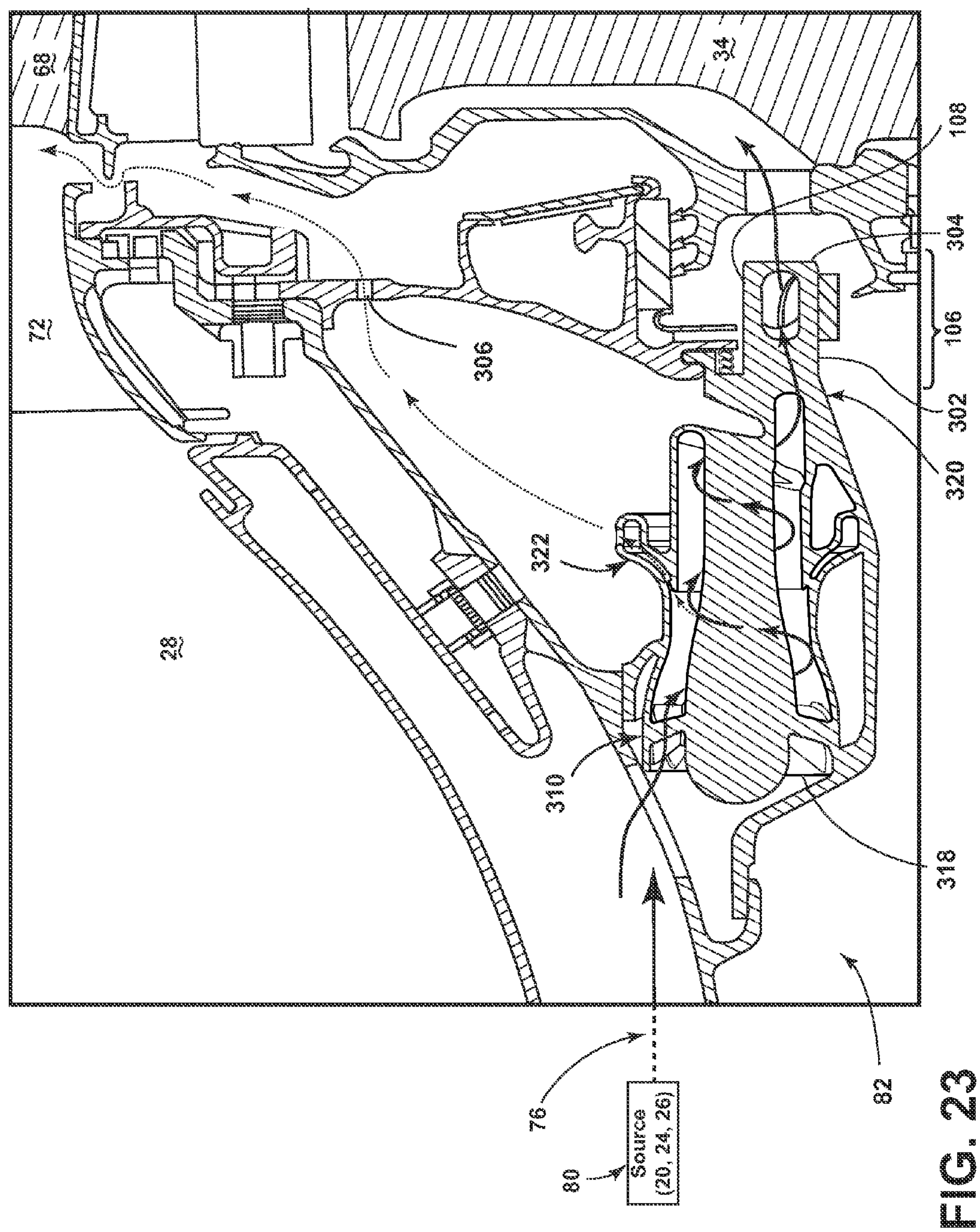
FIG. 23 is a schematic view of a section of the engine from FIG. 1, showing the centrifugal separator of FIG. 20 incorporated with an inducer section of the engine, according to a thirteenth embodiment.

FIG. 23 is a schematic view of a section of the engine 10, showing the centrifugal separator 310 of FIG. 20 incorporated with the inducer section 106, according to a thirteenth embodiment. As described above, the inducer section 106 can form a portion of the bypass conduit 82 of the bypass cooling circuit 76, and can include at least one inducer 108. The separator outlet 320 of the centrifugal separator 310 can be located upstream of the inducer 108 and can be in fluid communication with the inducer inlet 302, such that the fluid stream supplied to the inducer 108 is a reduced-particle stream. The inducer 108 accelerates and/or turns the reduced-particle stream and injects the reduced-particle stream into the HP turbine 34. As described above, the centrifugal separator 310 can be configured to accelerate the reduced-particle stream as well. The concentrated-particle stream from the centrifugal separator 310 is not directed to the inducer 108 or turbine 34, but rather is passed from the particle outlet 322 through the extraction vent 306.

Figure 24:
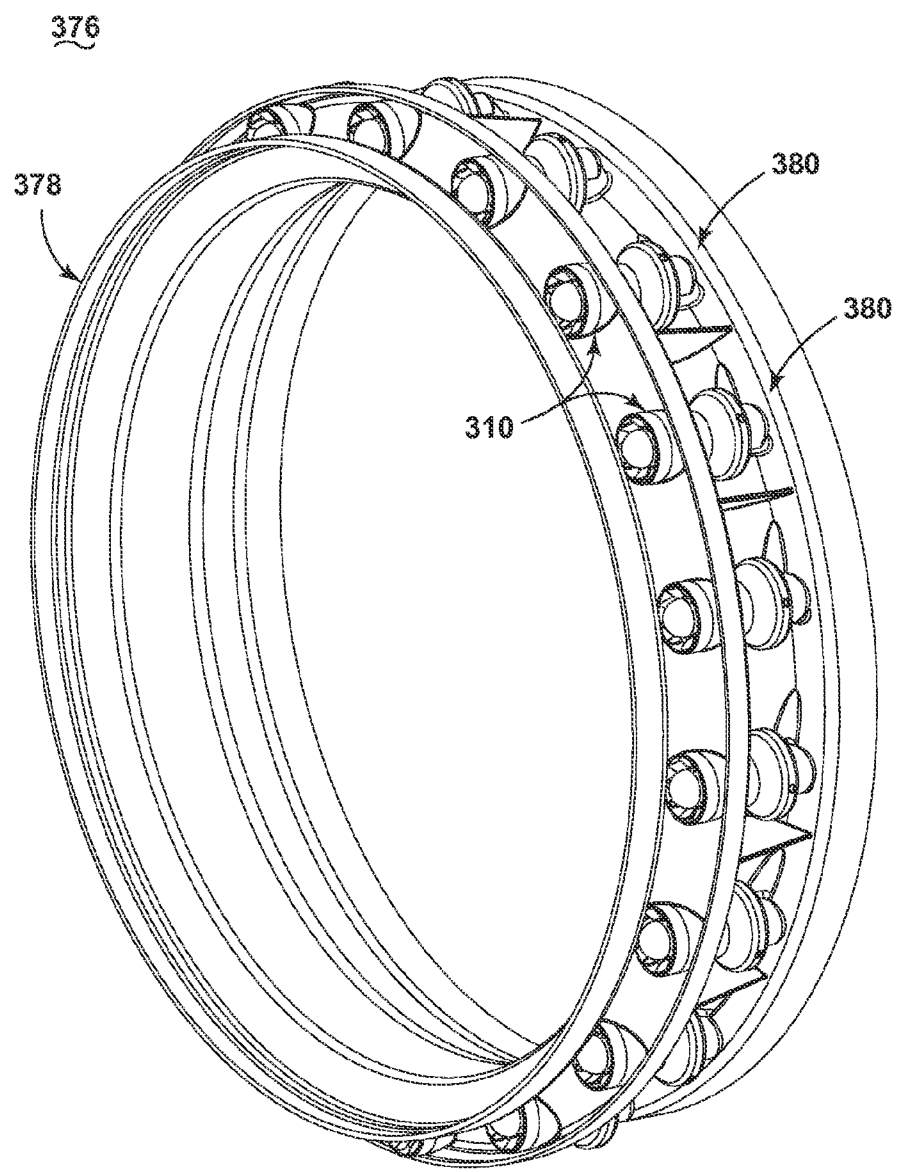
FIG. 24 is a perspective view showing an inducer section that can be incorporated in the engine of FIG. 1 according to a fourteenth embodiment.

FIG. 24 is a perspective view showing one example of an inducer section 376 that can be incorporated in the engine 10 according to a fourteenth embodiment. The inducer section 376 includes a ring-shaped body 378 having a plurality of centrifugal separators 310 according to the embodiment of FIG. 20, and inducers 380, all of which may be integrally formed or molded with the ring-shaped body 378. The ring-shaped body 378 can be coaxially aligned on the centerline 12 of the engine 10 (see FIG. 1).

Figure 25:
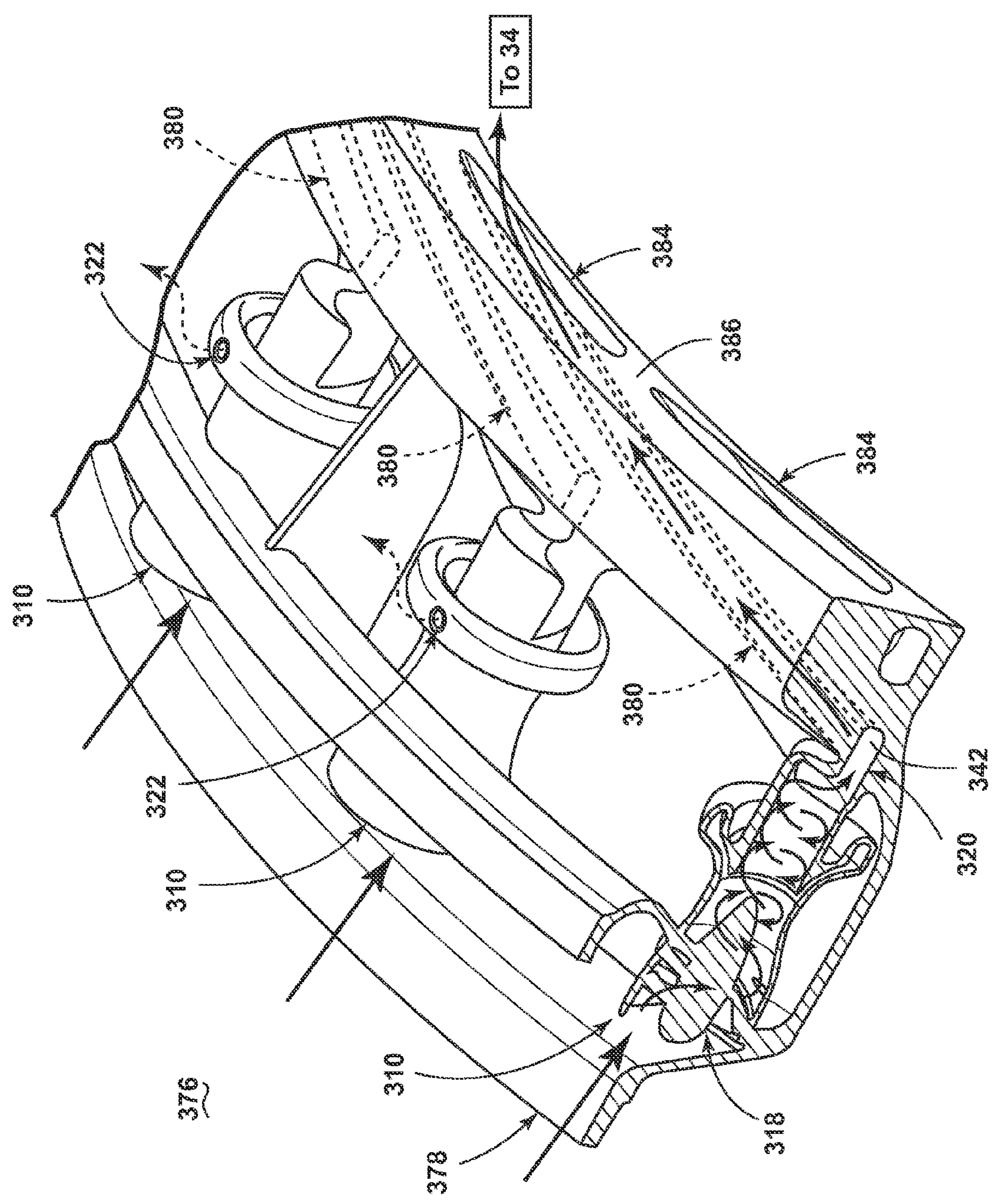
FIG. 25 is a close-up view of a portion of the inducer section of FIG. 24, showing the fluid flow through the inducer section during operation.

FIG. 25 is a close-up view of a portion of the inducer section 376 of FIG. 24, showing the fluid flow through the inducer section 376 during operation. The separator outlet 320 of the centrifugal separator 310 can be located upstream of the inducer 380 and can be in fluid communication with an inlet of the inducer 380, such that the fluid stream supplied to the inducer 380 is a reduced-particle stream. More specifically, as illustrated herein, a downstream portion of the exit conduit 342 can form a flow passage for the inducer 380, such that the exit conduit 342 accelerates and turns the reduced-particle stream, and injects the reduced-particle stream into the HP turbine 34. An outlet for the inducer 380 can be defined by an opening 384 in a side face 386 of the ring-shaped body 378 opposite the separator inlet 318.

FIGS. 26-32 show various optional modifications or additions to the engine 10 shown in FIG. 1, or bypass cooling circuit 76 shown in FIGS. 2-3. Unless otherwise noted, it is understood that the following optional modifications or additions can further be combined with any of the embodiments of the particle separators discussed above.

Figure 26:
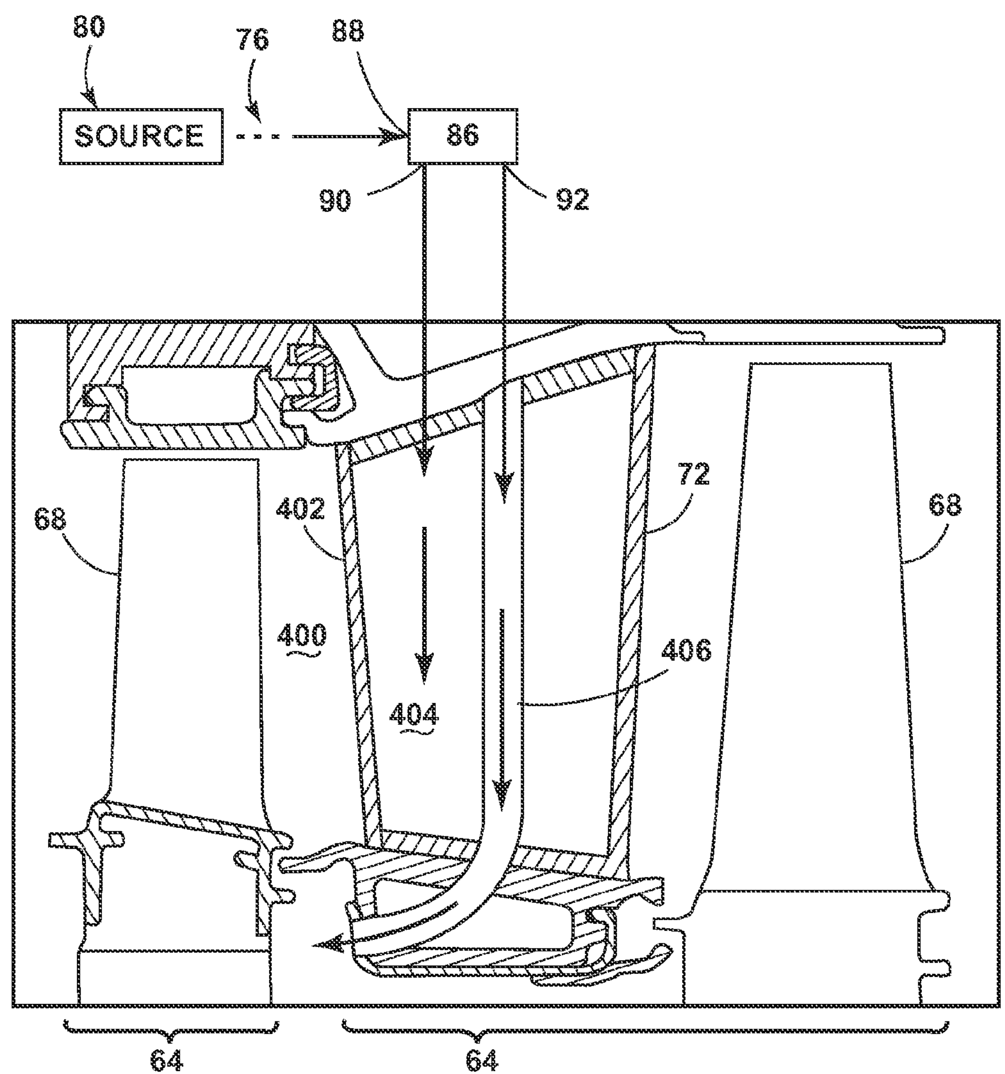
FIG. 26 is a schematic view of a section of the engine from FIG. 1, showing a portion of the bypass cooling circuit incorporated with the HP turbine according to a fifteenth embodiment.

FIG. 26 is a schematic view of a section of the engine 10, showing a portion of the bypass cooling circuit 76 incorporated with the HP turbine 34, according to a fifteenth embodiment. As described above, with reference to FIGS. 2-3, the bypass cooling circuit 76 can provide a reduced-particle stream from the particle separator 86 to the HP turbine 34 for cooling. In the illustrated embodiment, the concentrated-particle stream from the particle separator 86 is also utilized in the HP turbine 34. As described above, the HP turbine 34 includes multiple stages 64, each stage 64 having at least one rotating blade 68 paired with at least one static vane 72 (also called a nozzle). An inter-stage cavity 400 can be defined between two of the turbine stages 64.

For at least one of the turbine stages 64 of the illustrated embodiment, the vane 72 has an exterior 402 and an at least partially-hollow interior 404 which is in fluid communication with the separator outlet 90 of the particle separator 86 in order to receive the reduced-particle stream from the particle separator 86 and cool the interior 404 of the vane 72. The vane 72 further includes a conduit 406 extending through the vane 72 which is fluidly isolated from the interior 404. The conduit 406 is in fluid communication with the particle outlet 92 of the particle separator 86 in order to receive the concentrated-particle stream from the particle separator 86. The conduit 406 can extend out of the vane 72 to supply the inter-stage cavity 400 with the concentrated-particle stream in order to cool the exterior 402 of the vane 72. With the reduced-particle stream cooling the interior 404 and the concentrated-particle stream cooling the exterior 402, vane cooling can be increased while also minimizing the number of particles passed to the interior 404 of the vane 72; using the concentrated-particle stream for cooling the exterior 402 of the vane 72 is not as detrimental to the engine 10.

Figure 27:
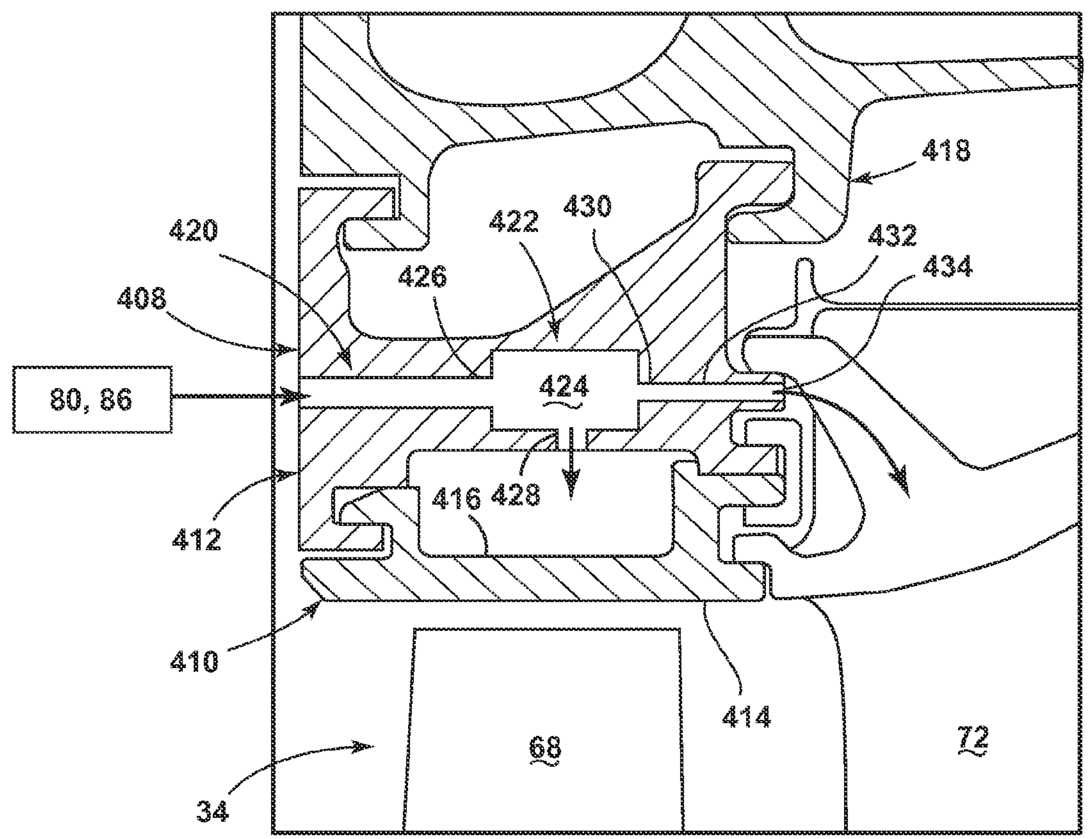
FIG. 27 is a schematic view of a section of the engine from FIG. 1 showing a shroud assembly according to a sixteenth embodiment.

FIG. 27 is a schematic view of a section of the engine from FIG. 1 showing a shroud assembly 408 according to a sixteenth embodiment. The shroud assembly 408 is shown as being associated with the HP turbine 34, although the shroud assembly 408 can alternatively be associated with the LP turbine. The shroud assembly 408 includes a shroud 410 which surrounds the blades 68 and a hanger 412 configured to couple the shroud 410 with a casing of the engine 10. The shroud 410 includes a front side 414 confronting one of the blades 68 of the HP turbine 34 and a back side 416 opposite the front side 414. The hanger 412 can directly mount the shroud 410 to the core casing 46 of the engine (see FIG. 1), or can indirectly couple the shroud 410 with the core casing 46 via a hanger support 418, as shown herein.

The shroud assembly 408 further includes a cooling conduit 420 extending through at least a portion of the hanger 412 to supply a cooling fluid stream to the back side 416 of the shroud 410, and at least one particle separator 422 forming part of the cooling conduit 420. For purposes of simplification, one particle separator 422 is shown in the cooling conduit 420 of FIG. 27, although it is understood that multiple particle separators 422 may be present.

As illustrated, the cooling conduit 420 can enter the hanger 412 in an axial direction with respect to the centerline of the engine 10. Alternatively, the cooling conduit 420 can enter the hanger 412 in a radial direction with respect to the centerline of the engine 10. When entering in a radial direction, the cooling conduit 420 may further pass through a portion of the hanger 412 support.

The particle separator 422 includes a through passage 424 with a separator inlet 426 which receives a fluid stream, a separator outlet 428 through which a reduced-particle stream is passed, and a particle outlet 430 through which a concentrated-particle stream is passed. The particle outlet 430 can be defined by a scavenge conduit 432 branching from the through passage 424; in such a case, the concentrated-particle stream may form a scavenge flow stream.

The scavenge conduit 432 can have a scavenge outlet 434 that can be fluidly coupled with a particle collector, an exhaust from the engine 10 or with another portion of the engine 10 for utilization. In the illustrated embodiment, the scavenge outlet 434 is fluidly coupled with an inter-stage cavity of the HP turbine 34 and is located between the hanger 412 and the at least one vane 72 of the HP turbine 34. The scavenge outlet 434 can be fluidly coupled downstream of at least one blade 68 of the HP turbine 34 to provide the concentrated-particle stream to the exterior of the vanes 72 for cooling. The inlet of the scavenge conduit 432 is provided by the particle outlet 430 of the particle separator 422.

In operation, as described above with reference to FIG. 2, the cooling fluid stream which enters the cooling conduit 420 can be provided from the source 80 of the bypass cooling circuit 76 or can be provided as a reduced-particle stream from the particle separator 86 of the bypass cooling circuit 76. The cooling fluid stream enters the particle separator 422 through the separator inlet 426 and the particle separator 422 separates particles from the cooling fluid stream and forms a concentrated-particle stream containing the separated particles, which is directed along the scavenge conduit 432, and a reduced-particle stream, which is passed through the separator outlet 428 to the back side 416 of the shroud 410.

Using the illustrated shroud assembly 408, at least some of the particles within the cooling fluid stream are removed before the cooling fluid stream reaches the back side 416 of the shroud 410. Without removing particles, particles can accumulate on the back side 416 of the shroud 410 and can act as a thermal insulator that elevates the shroud temperature. It is noted that some particles may remain in the reduced-particle fluid stream that reaches the back side 416 of the shroud 410. However, the remaining particles that are passed through the particle separator 422 tend to be smaller, and so the overall amount of particles accumulated on the back side 416 of the shroud 410 is reduced, which in turn reduces the thermal insulation effect on the cooled side of the shroud 410.

The particle separator 422 is shown only schematically in FIG. 27, but it is understood that the particle separator 422 may comprise any of the specific embodiments shown herein. For example, the particle separator 422 may be an inertial separator which separates particles from the cooling air flow using a combination of forces, such as centrifugal, gravitational, and inertial. More specifically, the inertial separator may be the inertial separator 250 shown in FIGS. 14-17 or the inertial separator 250' shown in FIG. 19.

In another example, the particle separator 422 may be a centrifugal or cyclonic separator, which uses cyclonic action to separate particles from the cooling air flow. More specifically, the centrifugal separator may be the centrifugal separator 110 shown in FIGS. 4-9, the centrifugal separator 110' shown in FIG. 10, the centrifugal separator 110" shown in FIG. 11, the centrifugal separator 210 shown in FIG. 12, or the centrifugal separator 310 shown in FIGS. 20-22.

Figure 28:
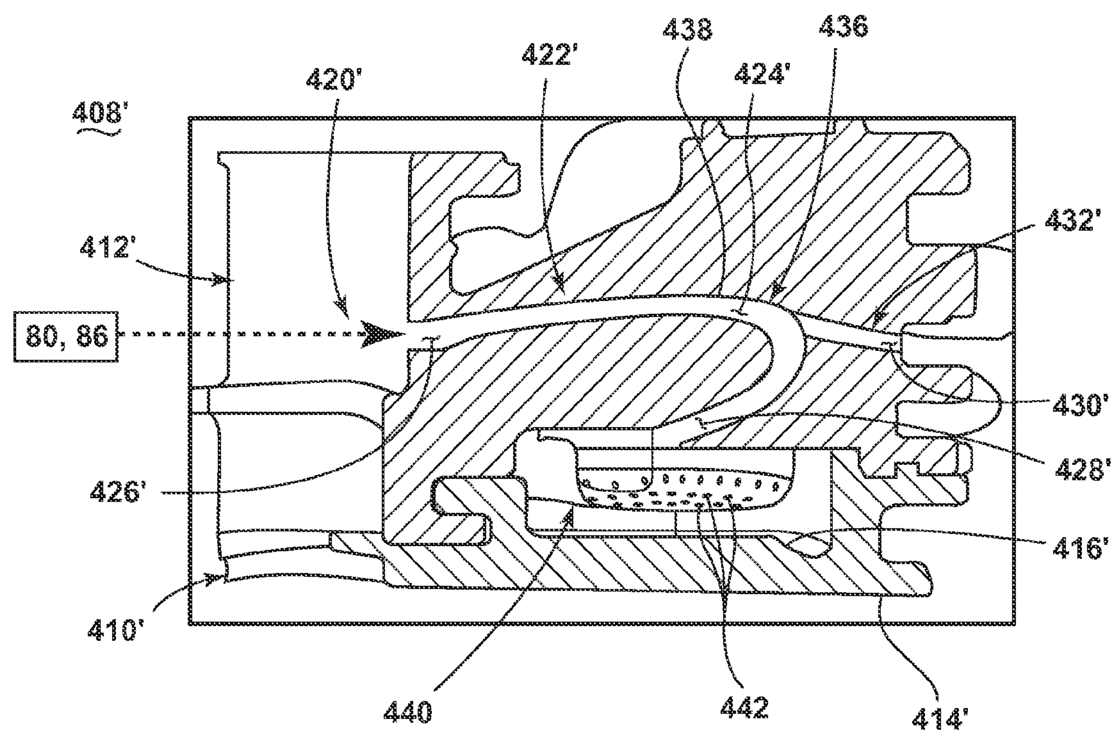
FIG. 28 is a schematic view of a section of the engine from FIG. 1 showing a shroud assembly according to a seventeenth embodiment.

FIG. 28 is a schematic view showing a modified version of a shroud assembly 408' according to a seventeenth embodiment, in which elements in common with the shroud assembly 408 of FIG. 27 are referred to by the same reference numerals bearing a prime (') symbol. The shroud assembly 408' differs from the shroud assembly 408 of FIG. 27 by including a particle separator in the form of an inertial separator 422'.

The inertial separator 422' includes at least one turn 436 in the through passage 424'. The turn 436 defines an outer wall 438 of the through passage 424', and the scavenge conduit 432' branches from the outer wall outer wall 438. The at least turn 436 is shaped to change the direction of the cooling fluid stream such that particles entrained in the cooling fluid stream are carried by their inertia against the outer wall, where they enter the scavenge conduit 430' along with a portion of the cooling fluid stream to form the concentrated-particle stream. The at least one turn 436 can change the direction of the cooling fluid stream at least 90 degrees; more specifically, the at least one turn 436 can change the direction of the cooling fluid stream at least 180 degrees.

The separator inlet 426' and separator outlet 428' can be radially offset from each other, relative to the centerline of the engine. The separator outlet 428' can exit through a radially-inward portion of the hanger 412' to supply the reduced-particle stream to the back side 416' of the shroud 410'. A baffle 440 having a plurality of openings 442 can be positioned between the separator outlet 428' and the back side 416' of the shroud 410' to distribute the reduced-particle stream more evenly over the back side 416'.

Figure 29:
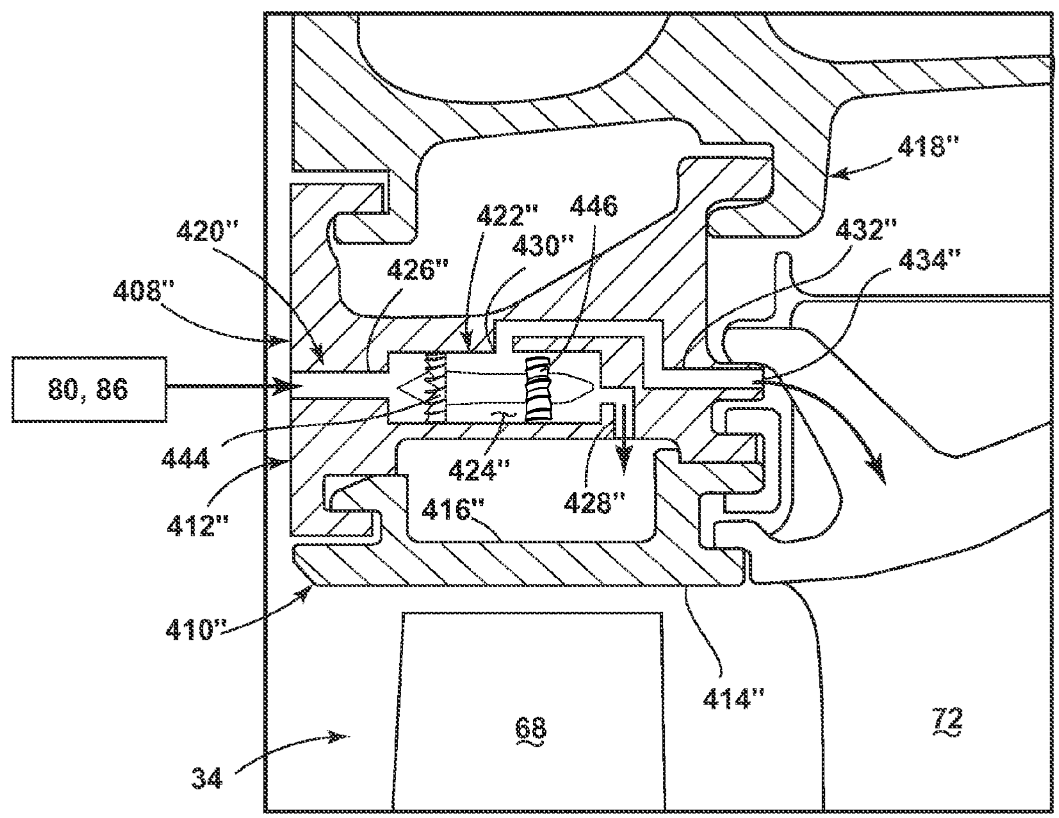
FIG. 29 is a schematic view of a section of the engine from FIG. 1 showing a shroud assembly according to an eighteenth embodiment.

FIG. 29 is a schematic view showing a modified version of a shroud assembly 408" according to an eighteenth embodiment, in which elements in common with the shroud assembly 408 of FIG. 27 are referred to by the same reference numerals bearing a double prime (") symbol The shroud assembly 408" differs from the shroud assembly 408 of FIG. 27 by including a particle separator in the form of a centrifugal separator 422".

The centrifugal separator 422" includes at least an angular velocity increaser 444 located within the through passage 424". An angular velocity decreaser 446 can further be located within through passage, downstream of the angular velocity increaser 444. In such an embodiment, the scavenge conduit 432" branch from the through passage 424" downstream of the angular velocity increaser 444 and upstream of the angular velocity decreaser 446.

Figure 30:
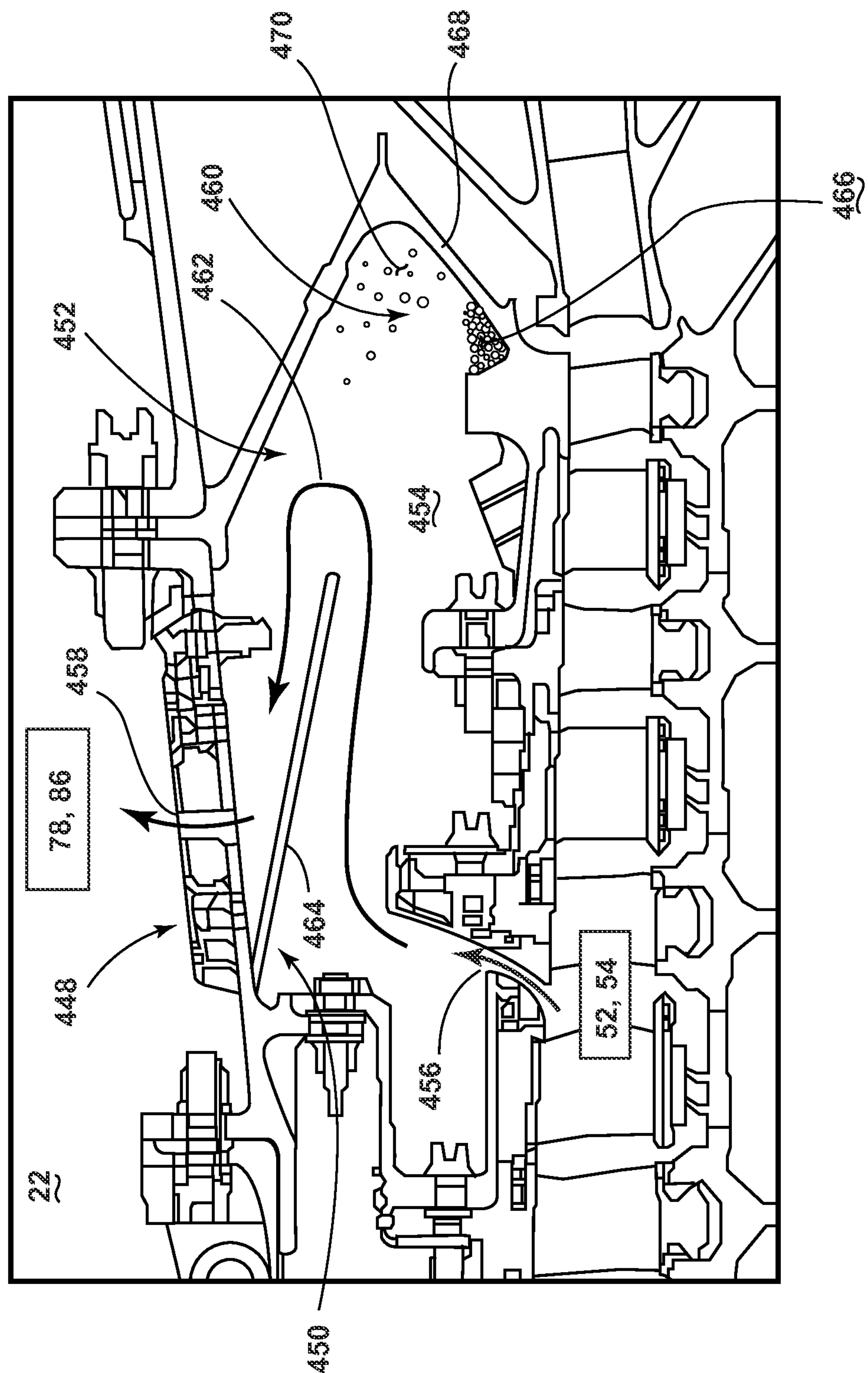
FIG. 30 is a schematic view of a section of the engine from FIG. 1, showing a baffle-type separator according to a nineteenth embodiment.

FIG. 30 is a schematic view of a portion of the compressor section 22 of the engine 10 from FIG. 1, showing a baffle-type separator 448 incorporated into the compressor section 22 according to a nineteenth embodiment. In this embodiment, the baffle-type separator 448 tonus a portion of the bypass cooling circuit 76 upstream of the hot portion of the engine 10 to which the cooling fluid is to be provided. The baffle-type separator 448 includes a baffle 450 (such as a scoop or louver) integrated into the cooling conduit 78. The baffle 450 is configured to force the fluid stream to turn, which has the effect of separating at least some of the particles out of the fluid stream instead of passing the particles downstream.

The baffle 450 can be positioned within a plenum 452 defining a through passage 454 and having a separator inlet 456 in fluid communication with one of the compressor stages 52, 54 of the compressor section 22 to receive a fluid stream, a separator outlet 458 through which a reduced-particle stream is passed, and a particle collector 460 in which separated particles are collected. The separator outlet 458 can be in fluid communication with a hot portion of the engine for cooling, such as the hot portion 78 shown in FIGS. 2-3, or with a downstream particle separator, such as the particle separator 86 shown in FIGS. 2-3 for further separation. The particle collector 460 can be configured to be accessed for service, such as for emptying the particle collector 460.

When entering the separator inlet 456 from the compressor stage 52, 54, the fluids stream may be swirling circumferentially and moving axially. The baffle 450 is oriented in the plenum 452 between the separator inlet 456 and separator outlet 458, for example in opposition to the separator inlet 456, to define a bend 462 in the through passage 454 directed away from the direction of the fluid flow, such that fluid most make a turn around the baffle 450 in order to reach the separator outlet 458. As shown herein, the baffle 450 may be provided as a plate 464 extending in the aft direction at an angle toward the centerline 12 of the engine 10. The plate 464 may define a substantially 180° bend 462 for the fluid stream.

FIG. 30 shows an upper portion of the compressor section 22 above the centerline 12 of the engine 10, and for this portion the particle collector 460 is provided as a radially-inward pocket 466 in an aft wall 468 of the plenum 452. It is noted that for the lower portion of the compressor section 22 below the centerline 12 of the engine 10, the particle collector 460 is provided as a radially-outward pocket 470 in the aft wall 468.

It is noted that both the baffle 450 and the plenum 452 can extend annularly about the centerline 12 of the engine, and further that multiple separator inlets 456, separator outlets 458, and/or particle collectors 460 can be spaced circumferentially about the centerline 12.

In operation, the fluid stream entering the separator inlet 456 will make a turn around the baffle 450 to reach the separator outlet 458. Due to inertial forces, at least some. If not a majority of, the particles entrained within the fluid stream will not make the turn, and will instead strike the aft wall 468 of the plenum 452 and fall into the particle collector 460. The fluid stream which turns around the baffle 450 will therefore have a lowered concentration of particles, thereby defining a reduced-particle stream. The reduced-particle stream then exits through the separator outlet 458.

Figure 31:
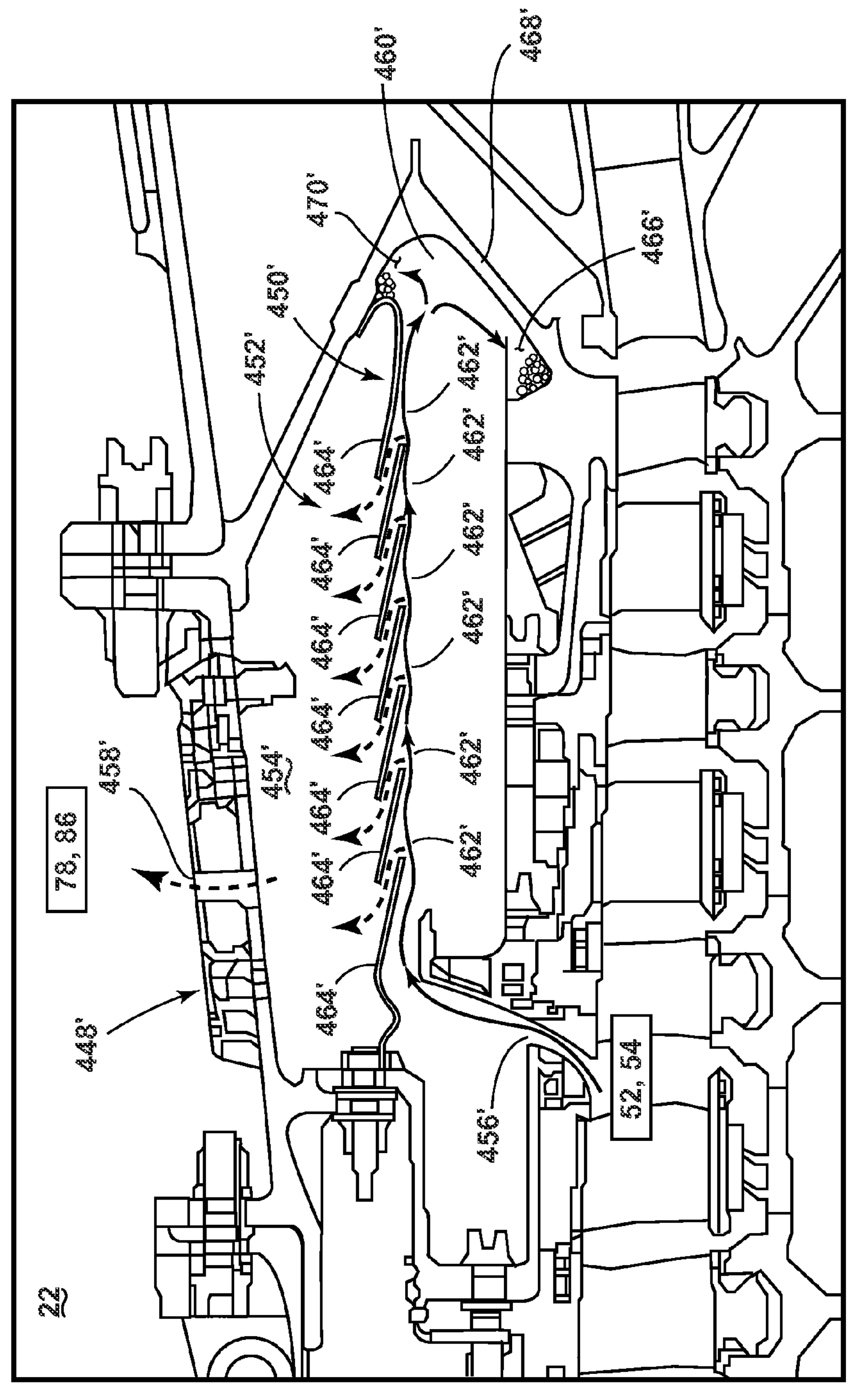
FIG. 31 is a schematic view of a section of the engine from FIG. 1, showing a baffle-type separator according to a twentieth embodiment.

FIG. 31 is a schematic view showing a modified version of a baffle-type separator 448' according to a twentieth embodiment, in which elements in common with the baffle-type separator 448 of FIG. 30 are referred to by the same reference numerals bearing a prime (') symbol. The baffle-type separator 448' differs from the baffle-type separator 448 of FIG. 30 by including multiple baffles 450' within the plenum 452'. As shown herein, the baffles 450' are provided as plates 464' substantially aligned with each other and extending in the aft direction at an angle toward the centerline 12 of the engine 10. The plates 464' are spaced from each other to define multiple bends 462' for the fluid stream.

Figure 32:
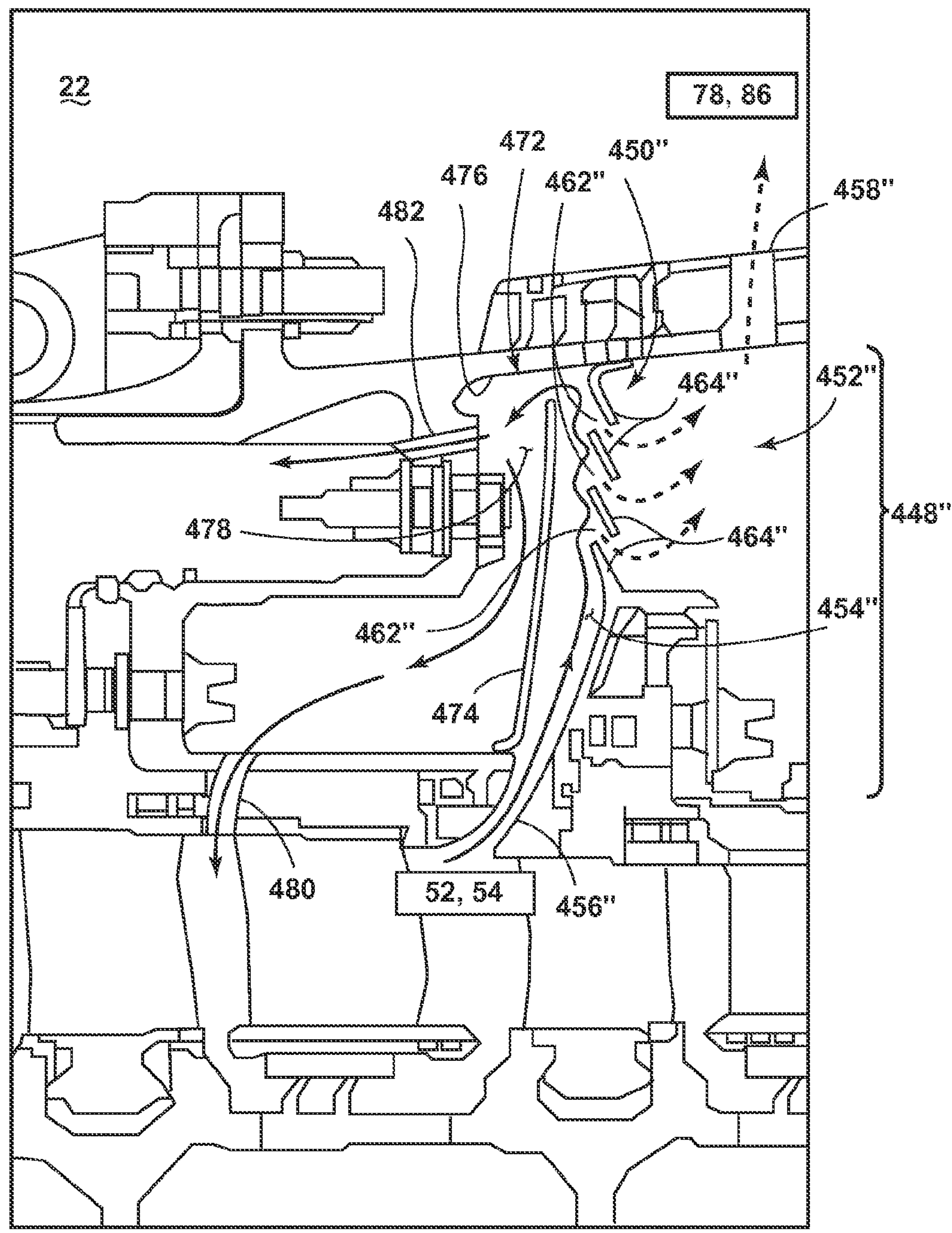
FIG. 32 is a schematic view of a section of the engine from FIG. 1, showing a baffle-type separator according to a twenty-first embodiment.

FIG. 32 is a schematic view showing a modified version of a baffle-type separator 448" according to a twenty-first embodiment, in which elements in common with the baffle-type separator 448 of FIG. 30 are referred to by the same reference numerals bearing a double prime (") symbol. The baffle-type separator 448" differs from the baffle-type separator 448 of FIG. 30 by including multiple baffles 450" within the plenum 452", as well as by being configured to create a concentrated-particle stream which contains the separated particles, rather than collecting the separated particles in a particle collector.

As shown herein, the baffles 450" are provided as substantially radially-oriented plates 464' with respect to the centerline 12 of the engine 10. The plates 464" are substantially aligned with each other and are spaced from each other to define multiple beads 462" for the fluid stream.

The through passage 454" further includes a particle outlet 472 through which the concentrated-particle stream is passed. The particle outlet 472 can be defined by a wall 474 extending radially with respect to the separator inlet 456" that is spaced from an upstream side of the baffles 450" as well as from a radially-outward wall 476 of the plenum 452" to define an outlet passage 478 branching from the through passage 454". Via the outlet passage 478, the concentrated-particle stream can optionally be returned to the compressor section 22 via a conduit 480 leading to an inter-stage cavity, or can be exhausted from the engine 10 via a conduit 482 leading to a bleed cavity.

The various embodiments of systems, methods, and other devices related to the technology disclosed herein provide improved particle separation, particularly in a turbine engine. One advantage that may be realized in the practice of some embodiments of the described systems is that the various embodiments of systems, methods, and other devices disclosed herein may be used, alone or in combination, to remove particles from a cooling air flow in a turbine engine. The reduction of particles in the cooling air can improve cooling and engine component durability. Another advantage that may be realized in the practice of some embodiments of the described systems and methods is that both the reduced-particle stream and the concentrated-particle steam created by the particle separation may be utilized within the engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A shroud assembly for a turbine engine having a compressor, a combustor, and a turbine within a casing, with the turbine having a plurality of annularly-arranged fixed vanes defining nozzles therebetween and a plurality of annularly-arranged rotating blades paired with the fixed vanes to define one stage of the turbine, the shroud assembly comprising:

a shroud having a front side confronting the blades and a back side opposite the front side:

a hanger configured to couple the shroud with the casing:

a cooling conduit extending through at least a portion of the hanger to supply a cooling fluid stream to the back side of the shroud; and at least one particle separator having a through passage forming part of the cooling conduit and a scavenge conduit branching from the through passage;

wherein the at least one particle separator separates particles from the cooling fluid stream in the form of a concentrated-particle stream containing the separated particles, which is directed along the scavenge conduit, and the remaining cooling fluid stream forms a reduced-particle stream, which is passed along the cooling conduit to the back side of the shroud;

wherein the at least one particle separator comprises at least one centrifugal separator; and wherein the at least one centrifugal separator comprises an angular velocity decreaser located within through passage, downstream of the angular velocity increaser.

2. The shroud assembly of claim 1 wherein the scavenge conduit comprises a scavenge conduit inlet located downstream of the angular velocity increaser and upstream of the angular velocity decreaser.

3. The shroud assembly of claim 1 wherein the at least one particle separator comprises at least one inertial separator having a turn in the through passage defining an outer wall of the through passage, and the scavenge conduit has an inlet at the outer wall, with the turn being shaped to change the direction of the cooling fluid stream such that particles entrained in the cooling fluid stream are carried by their inertia against the outer wall where they enter the scavenge conduit along with a portion of the cooling fluid stream to form the concentrated-particle stream.

4. The shroud assembly of claim 3 wherein the turn changes the direction of the cooling fluid stream at least 90 degrees.

5. The shroud assembly of claim 4 wherein the turn changes the direction of the cooling fluid stream at least 180 degrees.

6. The shroud assembly of claim 3 wherein the turbine engine defines a centerline, about which the blades rotate, and the turn has an inlet and an outlet, which are radially offset from each other relative to the centerline.

7. A shroud assembly for a turbine engine having a compressor, a combustor, and a turbine within a casing, with the turbine having a plurality of annularly-arranged fixed vanes defining nozzles therebetween and a plurality of annularly-arranged rotating blades paired with the fixed vanes to define one stage of the turbine, the shroud assembly comprising:

a shroud having a front side confronting the blades and a back side opposite the front side;

a hanger configured to couple the shroud with the casing;

a cooling conduit extending through at least a portion of the hanger to supply a cooling fluid stream to the back side of the shroud; and at least one particle serparator having through passage forming part of the cooling conduit and a scavenge conduit branching from the through passage;

wherein the at least one particle separator separates particles from the cooling fluid stream in the form of a concentrated-particle stream containing the separated particles, which is directed along the scavenge conduit, and the remaining cooling fluid stream forms a reduced-particle stream, which is passed along the cooling conduit to the back side of the shroud;

wherein the at least one particle separator comprises at least one inertial separator having a turn in the through passage defining an outer wall of the through passage, and the scavenge conduit has an inlet at the outer wall, with the turn being shaped to change the direction of the cooling fluid stream such that particles entrained in the cooling fluid stream are carried by their inertia against the outer wall where they enter the scavenge conduit along with a portion of the cooling fluid stream to form the concentrated-particle stream; and wherein the scavenge conduit has a scavenge outlet between the hanger and the plurality of annularly-arranged fixed vanes.

8. The shroud assembly of claim 7 wherein the scavenge outlet is fluidly coupled downstream of the plurality of annularly-arranged rotating blades.

9. A shroud assembly for a turbine engine having a compressor, a combustor, and a turbine within a casing, with the turbine having a plurality of annularly-arranged fixed vanes defining nozzles therebetween and a plurality of annularly-arranged rotating blades paired with the fixed vanes to define one stage of the turbine, the shroud assembly comprising:

a shroud having a front side confronting the blades and a back side opposite the front side;

a hanger configured to couple the shroud with the casing;

a cooling conduit extending through at least a portion of the hanger to supply a cooling fluid stream to the back side of the shroud; and at least one particle separator having a through passage forming part of the cooling conduit and a scavenge conduit branching from the through passage;

wherein the at least one particle separator separates particles from the cooling fluid stream in the form of a concentrated-particle stream containing the separated particles, which is directed along the scavenge conduit, and the remaining cooling fluid stream forms a reduced-particle stream, which is passed along the cooling conduit to the back side of the shroud; and wherein the scavenge conduit has a scavenge outlet between the hanger and the plurality of annularly-arranged fixed vanes.

10. The shroud assembly of claim 9 wherein the scavenge outlet is fluidly coupled downstream of the plurality of annularly-arranged rotating blades.

11. A shroud assembly for a turbine engine having a compressor, a combustor, and a turbine within a casing, with the turbine having a plurality of annularly-arranged fixed vanes defining nozzles therebetween and a plurality of annularly-arranged rotating blades paired with the fixed vanes to define one stage of the turbine, the shroud assembly comprising:

a shroud having a front side confronting the blades and a back side opposite the front side;

a hanger configured to couple the shroud with the casing;

a cooling conduit extending through at least a portion of the hanger to supply a cooling fluid stream to the back side of the shroud; and at least one particle separator having a through passage forming part of the cooling conduit and a scavenge conduit branching from the through passage;

wherein the at least one particle separator separates particles from the cooling fluid stream in the form of a concentrated-particle stream containing the separated particles, which is directed along the scavenge conduit, and the remaining cooling fluid stream forms a reduced-particle stream, which is passed along the cooling conduit to the back side of the shroud;

wherein the at least one particle separator comprises at least one inertial separator having a turn in the through passage defining an outer wall of the through passage, with the turn being shaped to change the direction of the cooling fluid stream such that particles entrained in the cooling fluid stream are carried by their inertia against the outer wall; and wherein the turbine engine defines a centerline, about which the blades rotate, and the turn has an inlet and an outlet, which are radially offset from each other relative to the centerline;

wherein the at least one particle separator comprises at least one centrifugal separator; and wherein the at least one centrifugal separator comprises on angular velocity decreaser located within through passage, downstream of the angular velocity increaser.

12. The shroud assembly of claim 11 wherein the scavenge conduit comprises a scavenge conduit inlet located downstream of the angular velocity increaser and upstream of the angular velocity decreaser.

13. The shroud assembly of claim 11 wherein the turn changes the direction of the cooling fluid stream at least 90 degrees.

14. The shroud assembly of claim 13 wherein the turn changes the direction of the cooling fluid stream at least 180 degrees.

* * * * *